Sept. 9, 1952  G. BARDET  2,609,734
MACHINE FOR VALVING BAG BLANKS
Filed Sept. 16, 1947  31 Sheets-Sheet 1
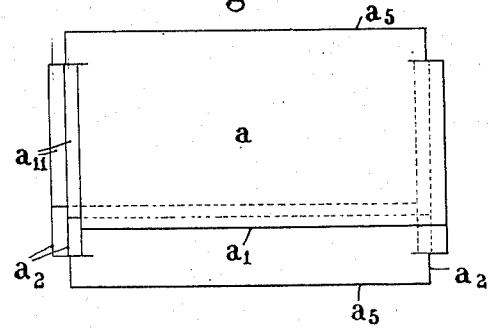
Fig. 1.
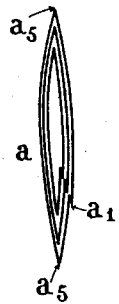
Fig. 2.
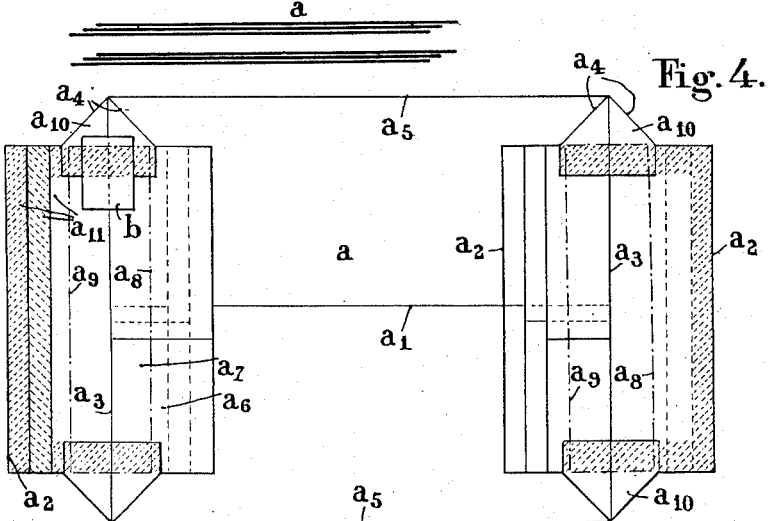
Fig. 3.
Fig. 4.
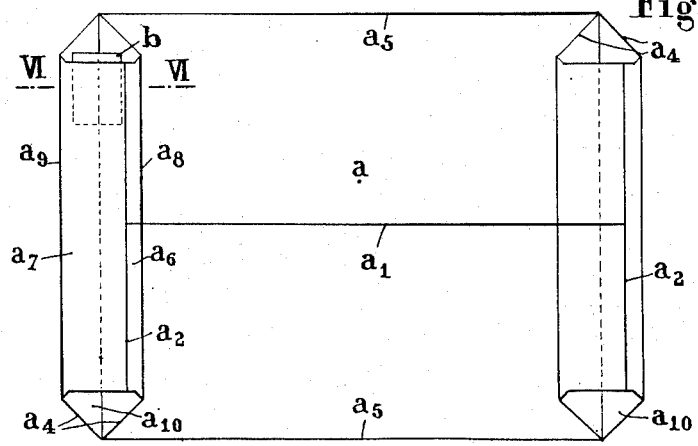
Fig. 5.
Inventor
Gerard Bardet
By Robert E. Burns
Attorney Sept. 9, 1952 G. BARDET 2,609,734
MACHINE FOR VALVING BAG BLANKS
Filed Sept. 16, 1947 31 Sheets-Sheet 2
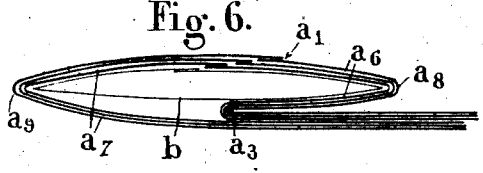
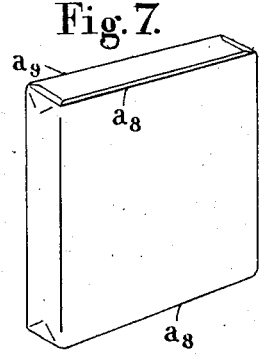
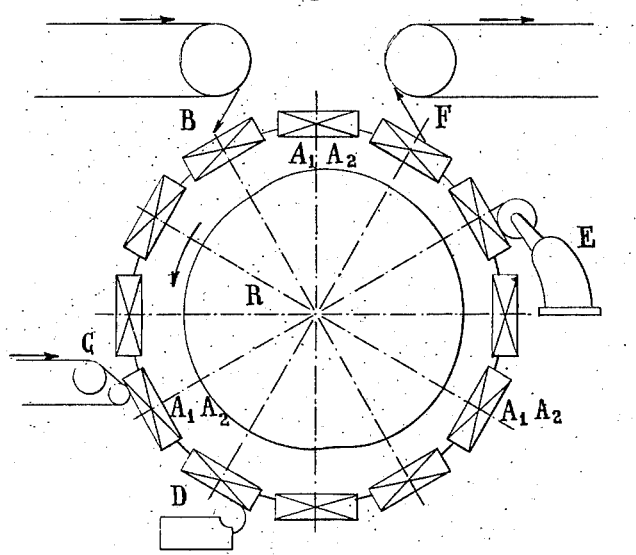
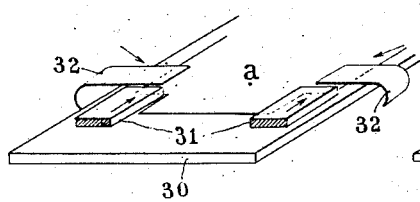
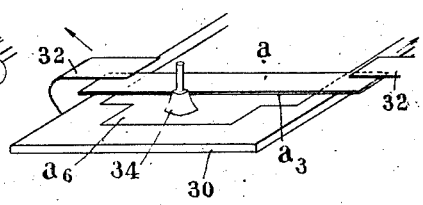

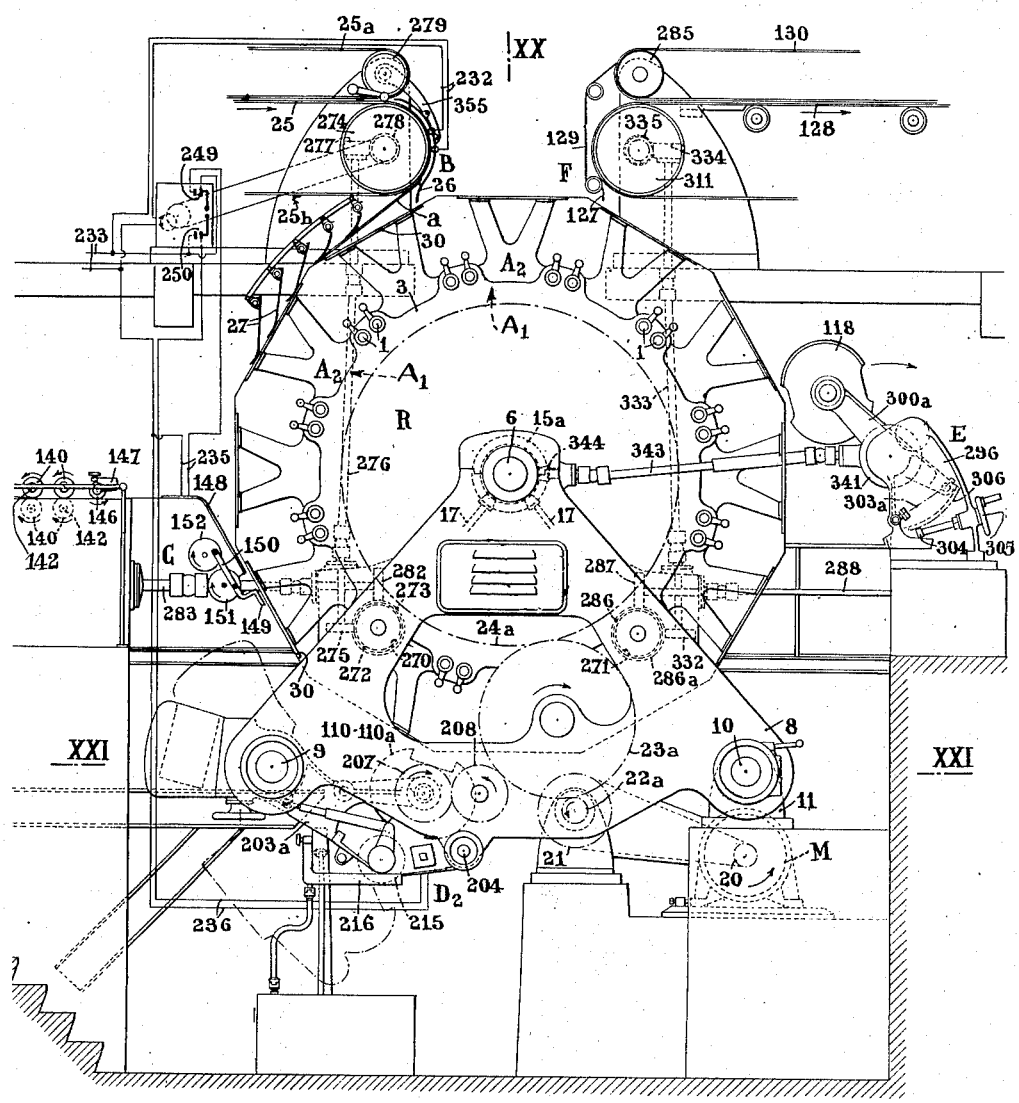
Fig.19.ª

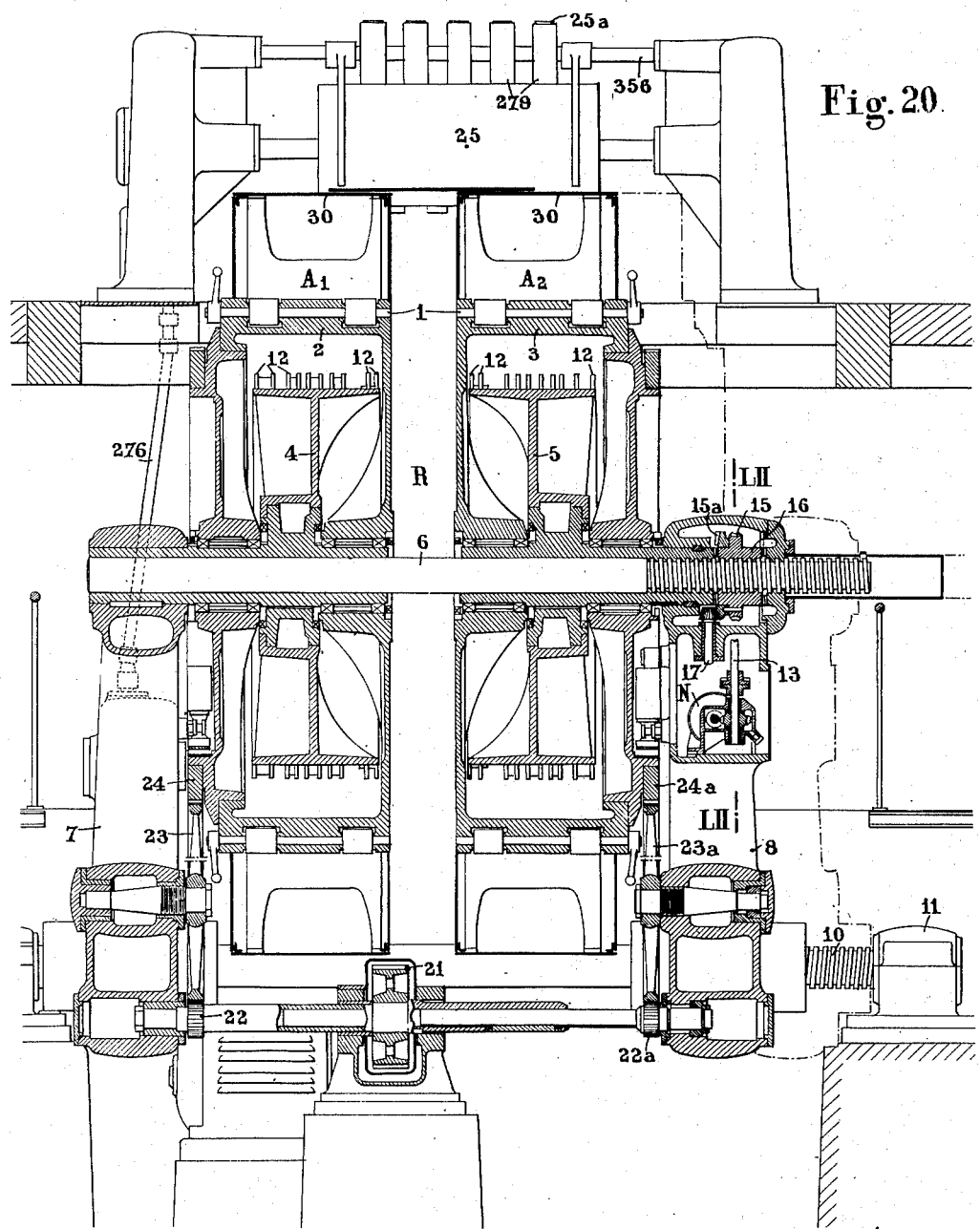

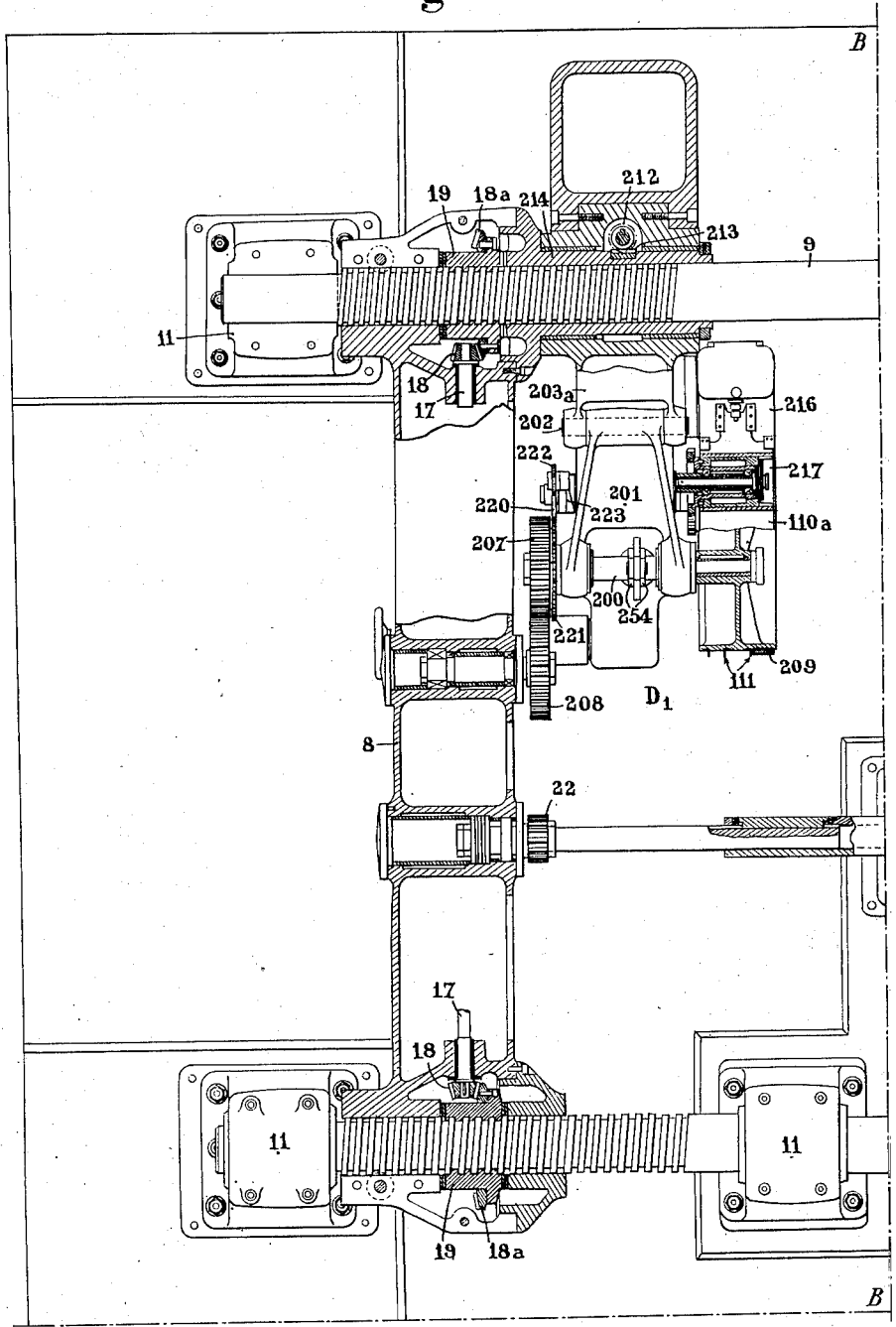

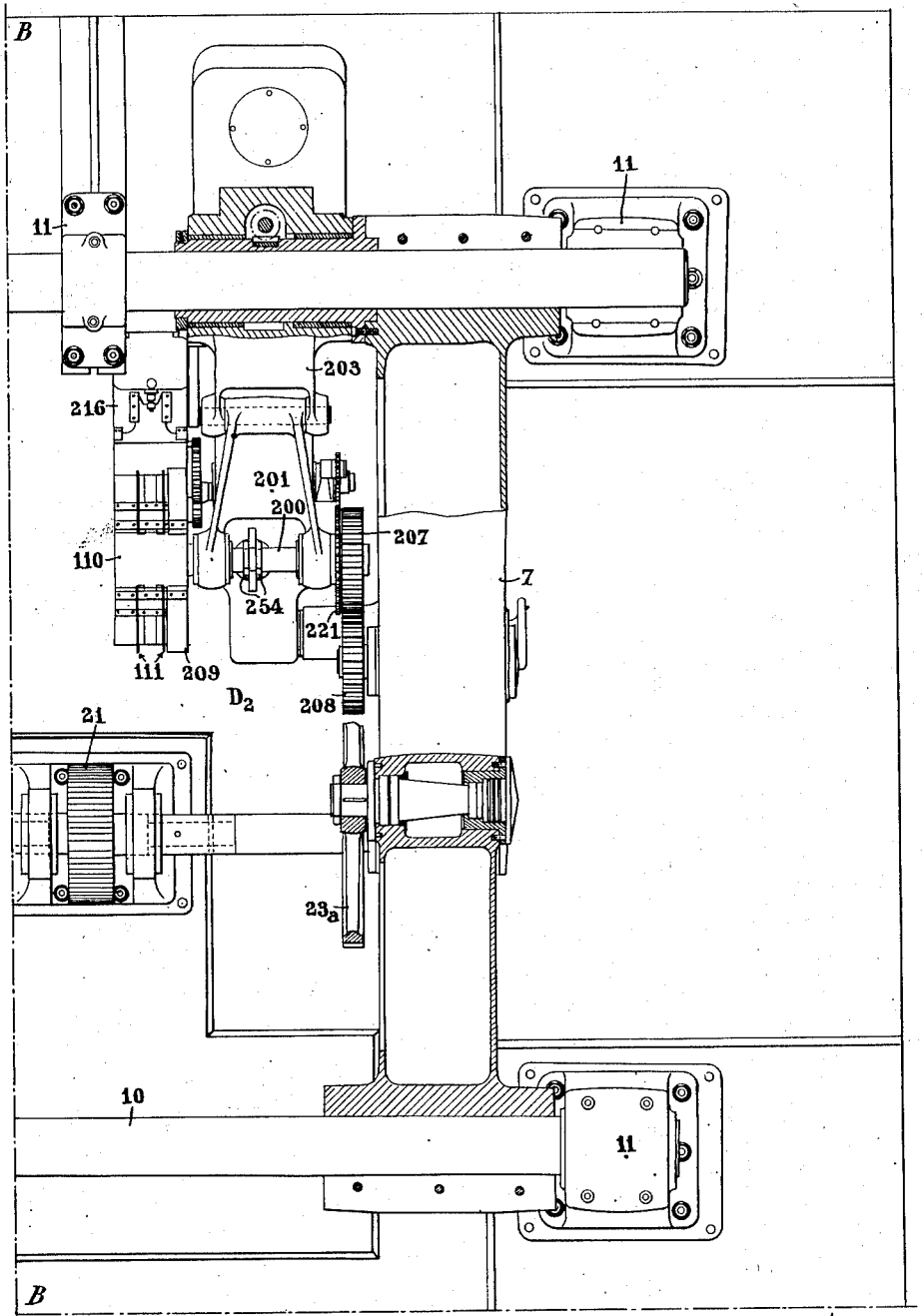

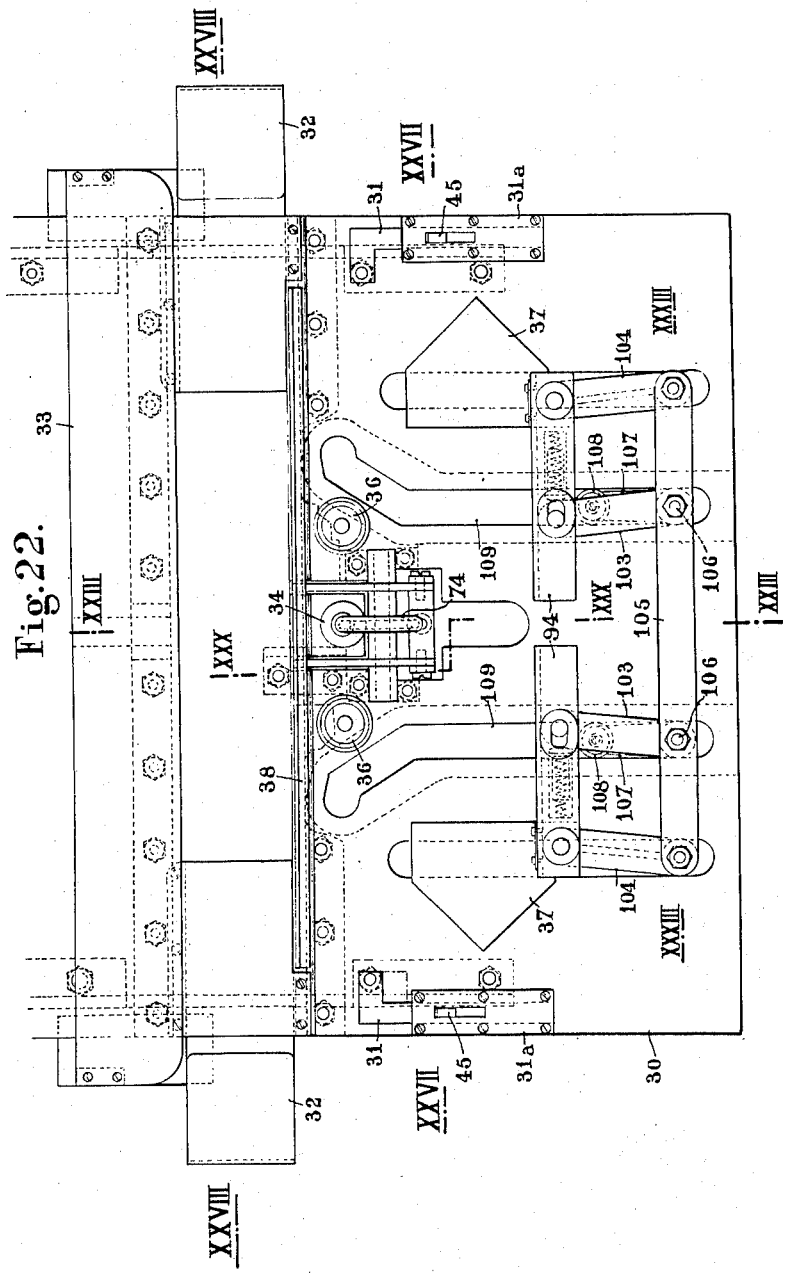

Sept. 9, 1952  G. BARDET  2,609,734
MACHINE FOR VALVING BAG BLANKS
Filed Sept. 16, 1947  31 Sheets-Sheet 10
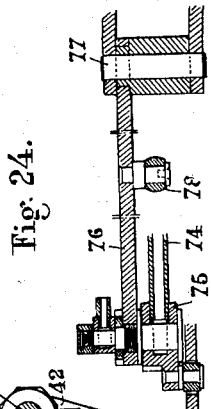
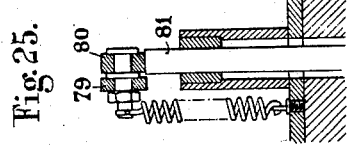
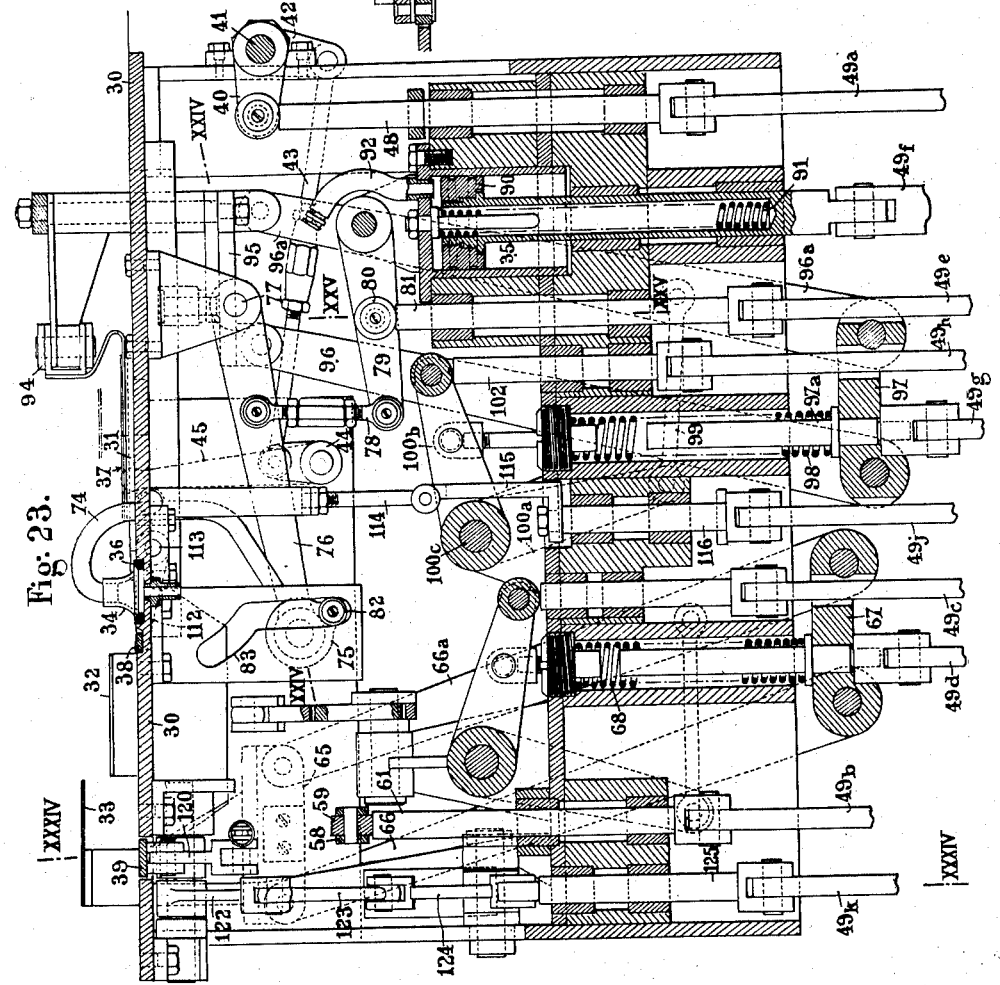
Inventor
Gerard Bardet
By Robert E Burn
Attorney Sept. 9, 1952    G. BARDET    2,609,734
MACHINE FOR VALVING BAG BLANKS
Filed Sept. 16, 1947    31 Sheets-Sheet 11
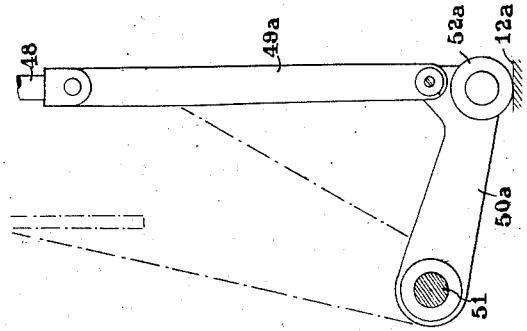
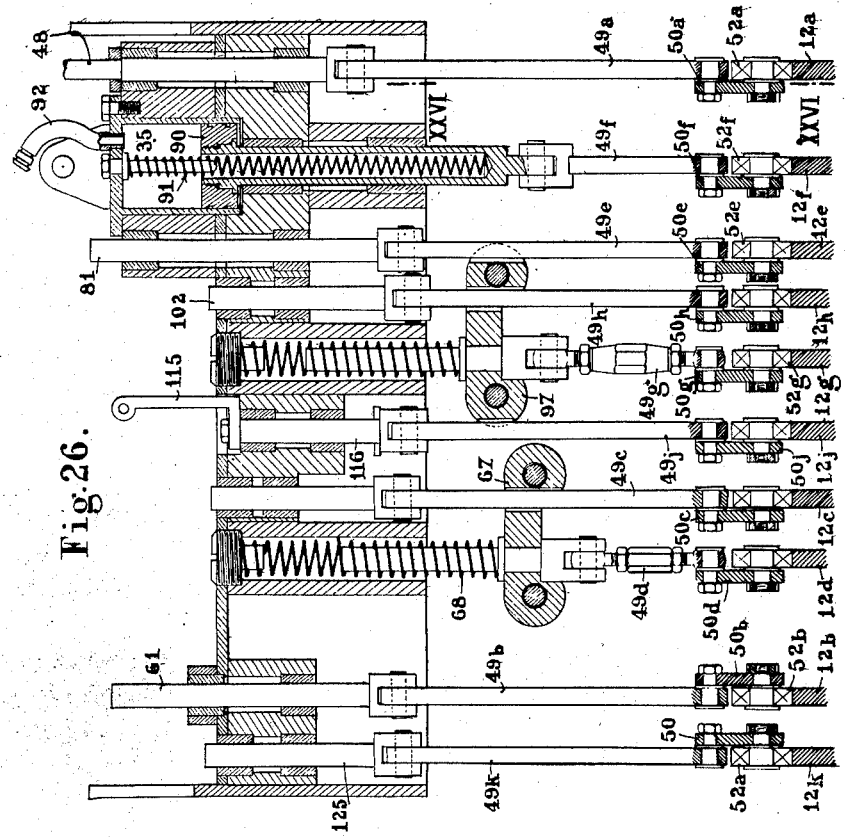
Inventor
Gerard Bardet
By Robert E Burns
Attorney

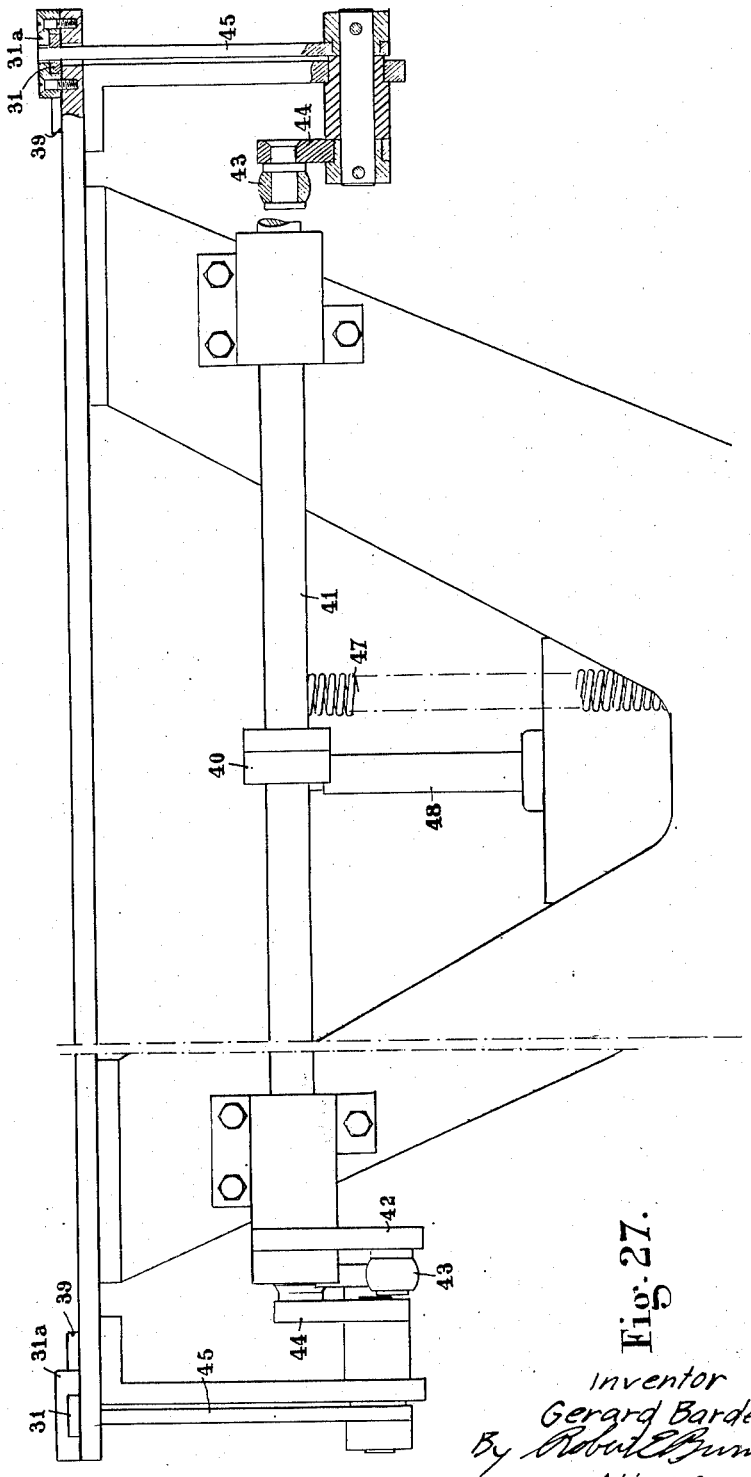

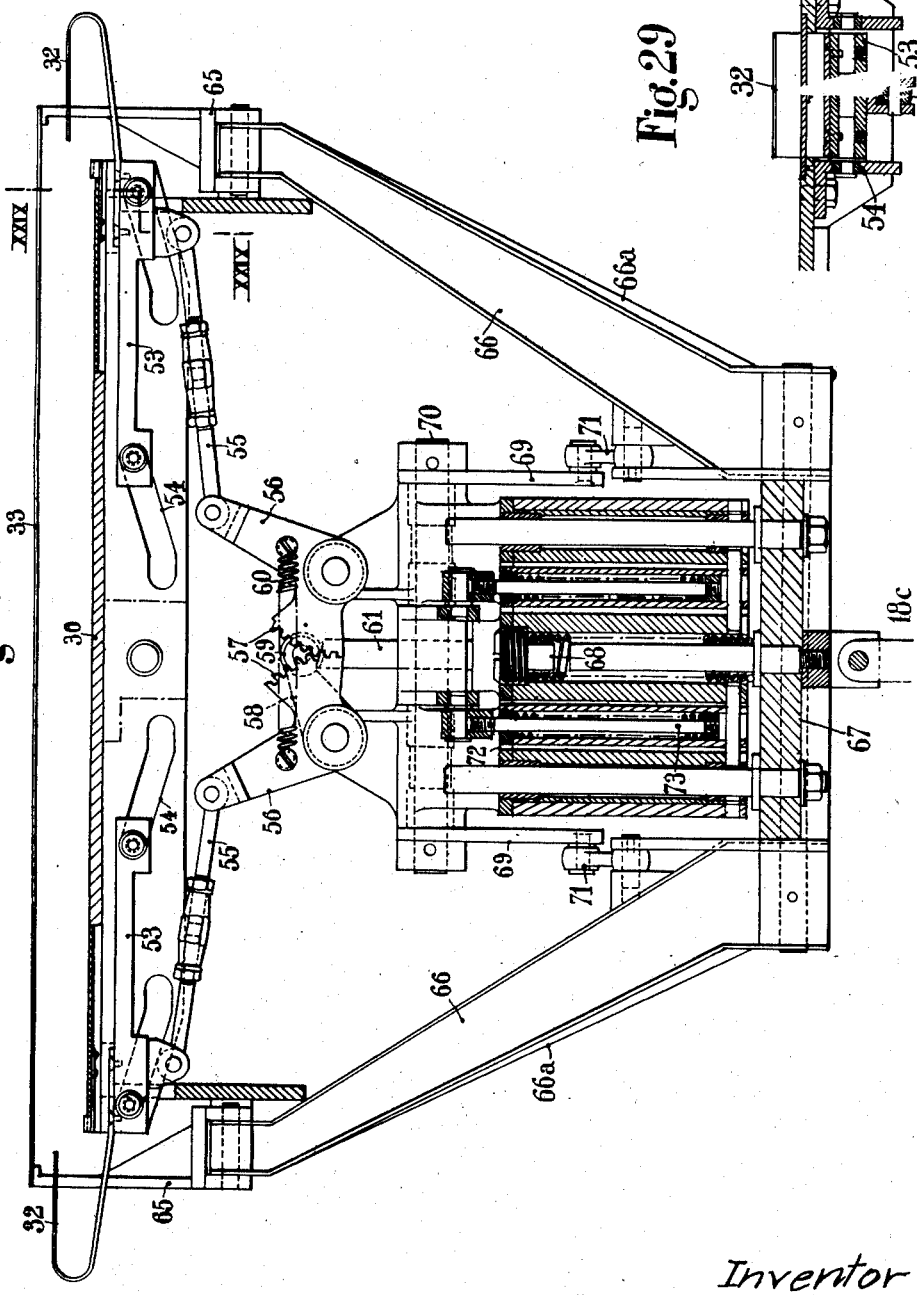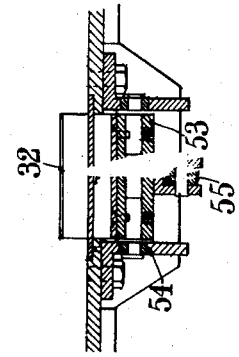

Sept. 9, 1952 G. BARDET 2,609,734
MACHINE FOR VALVING BAG BLANKS
Filed Sept. 16, 1947 31 Sheets-Sheet 14
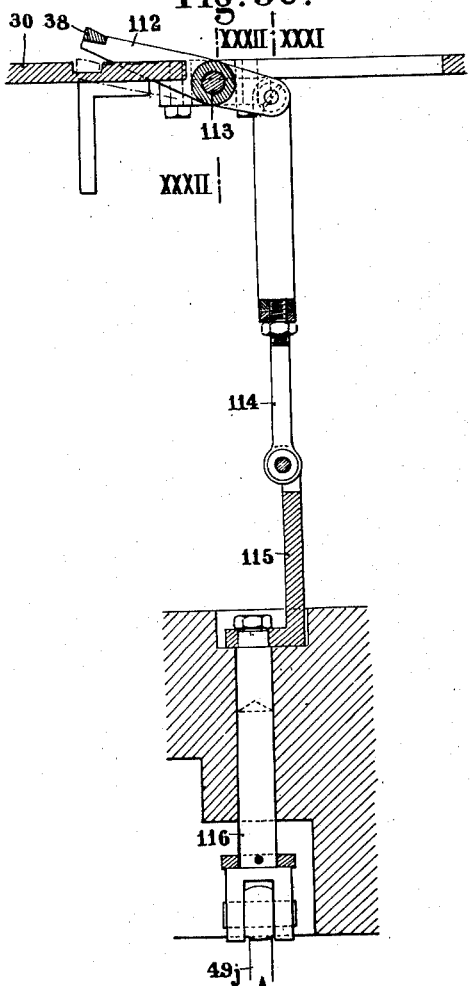
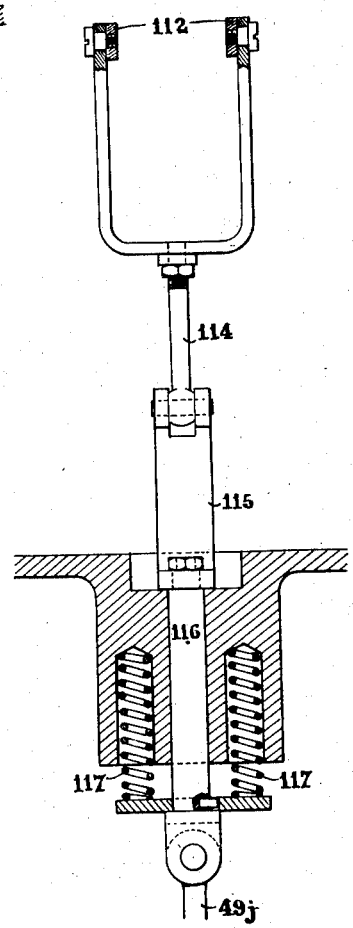
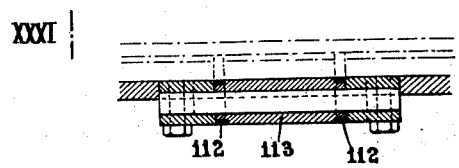
Inventor
Gerard Bardet
By Robert E Burns
Attorney Sept. 9, 1952     G. BARDET     2,609,734
MACHINE FOR VALVING BAG BLANKS
Filed Sept. 16, 1947     31 Sheets-Sheet 15

Inventor
Gerard Bardet
By Robert E. Burns
Attorney

Sept. 9, 1952  G. BARDET  2,609,734
MACHINE FOR VALVING BAG BLANKS
Filed Sept. 16, 1947  31 Sheets-Sheet 16

Inventor
Gerard Bardet
By Robert E Burns
Attorney

Sept. 9, 1952 G. BARDET 2,609,734
MACHINE FOR VALVING BAG BLANKS
Filed Sept. 16, 1947 31 Sheets-Sheet 18
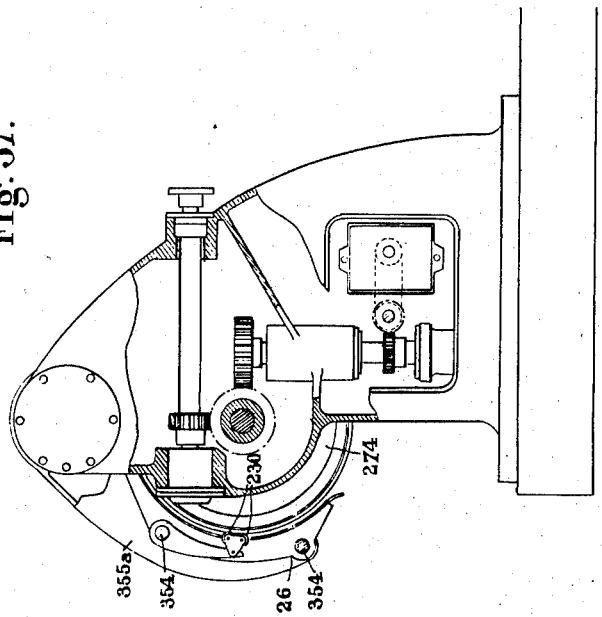
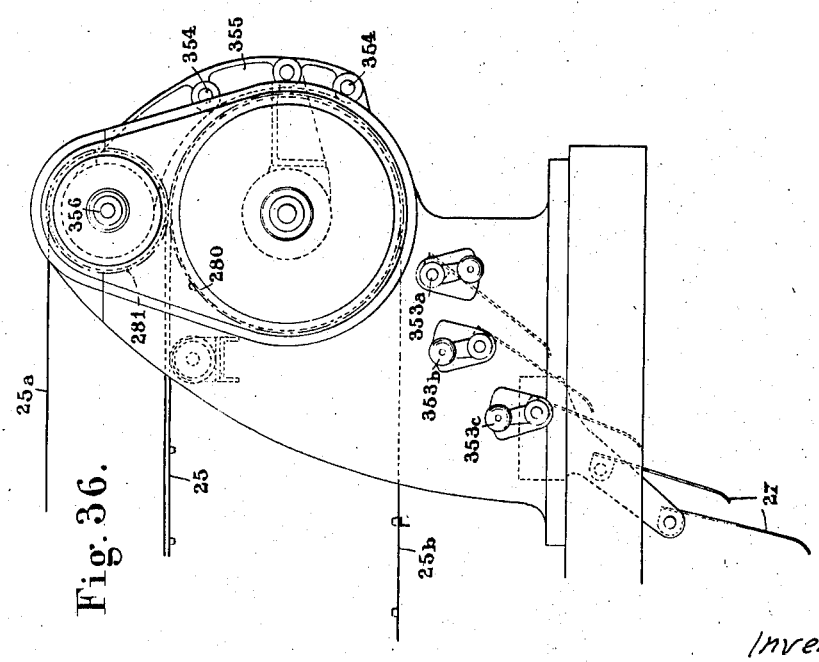
Inventor
Gerard Bardet
By Robert E Burns
Attorney Sept. 9, 1952 G. BARDET 2,609,734
MACHINE FOR VALVING BAG BLANKS
Filed Sept. 16, 1947 31 Sheets-Sheet 19

Inventor
Gerard Bardet
By Robert E Burns
Attorney

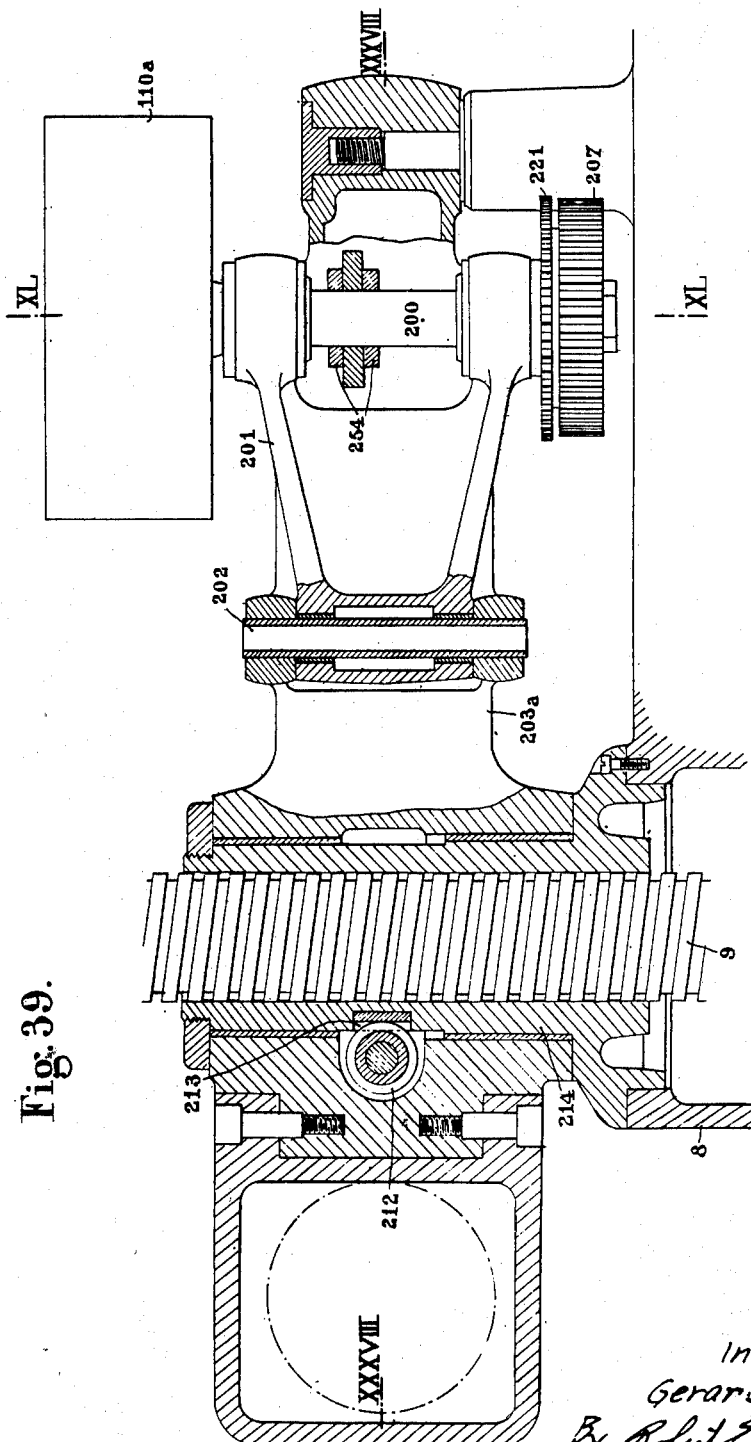

Sept. 9, 1952  G. BARDET  2,609,734
MACHINE FOR VALVING BAG BLANKS
Filed Sept. 16, 1947  31 Sheets-Sheet 21
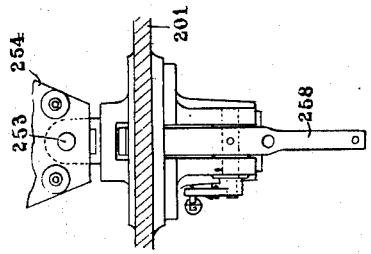
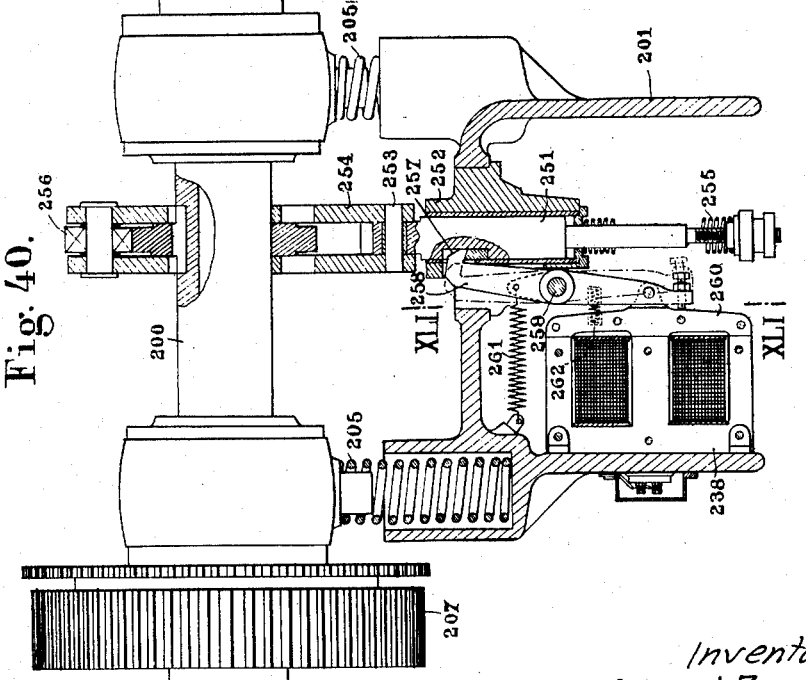
Inventor
Gerard Bardet
By Robert E. Burns
Attorney

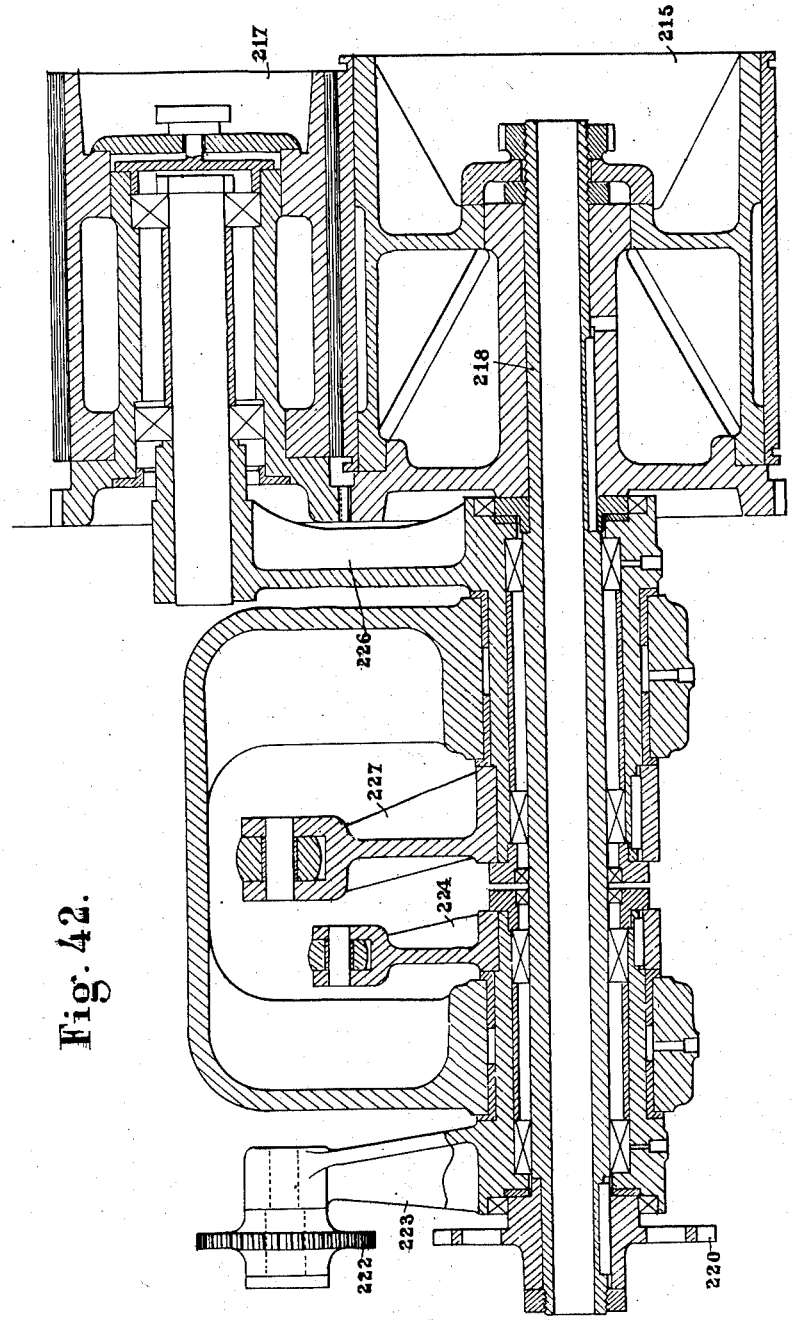

Sept. 9, 1952 G. BARDET 2,609,734
MACHINE FOR VALVING BAG BLANKS
Filed Sept. 16, 1947 31 Sheets-Sheet 23

Inventor
Gerard Bardet
By Robert E Burns
Attorney

Sept. 9, 1952 G. BARDET 2,609,734
MACHINE FOR VALVING BAG BLANKS
Filed Sept. 16, 1947 31 Sheets-Sheet 24

Inventor
Gerard Bardet
By Robert E. Burns
Attorney

Sept. 9, 1952 G. BARDET 2,609,734
MACHINE FOR VALVING BAG BLANKS
Filed Sept. 16, 1947 31 Sheets-Sheet 25

Inventor
Gerard Bardet
By Robert E. Burns
Attorney

Sept. 9, 1952
G. BARDET
2,609,734
MACHINE FOR VALVING BAG BLANKS
Filed Sept. 16, 1947
31 Sheets-Sheet 26
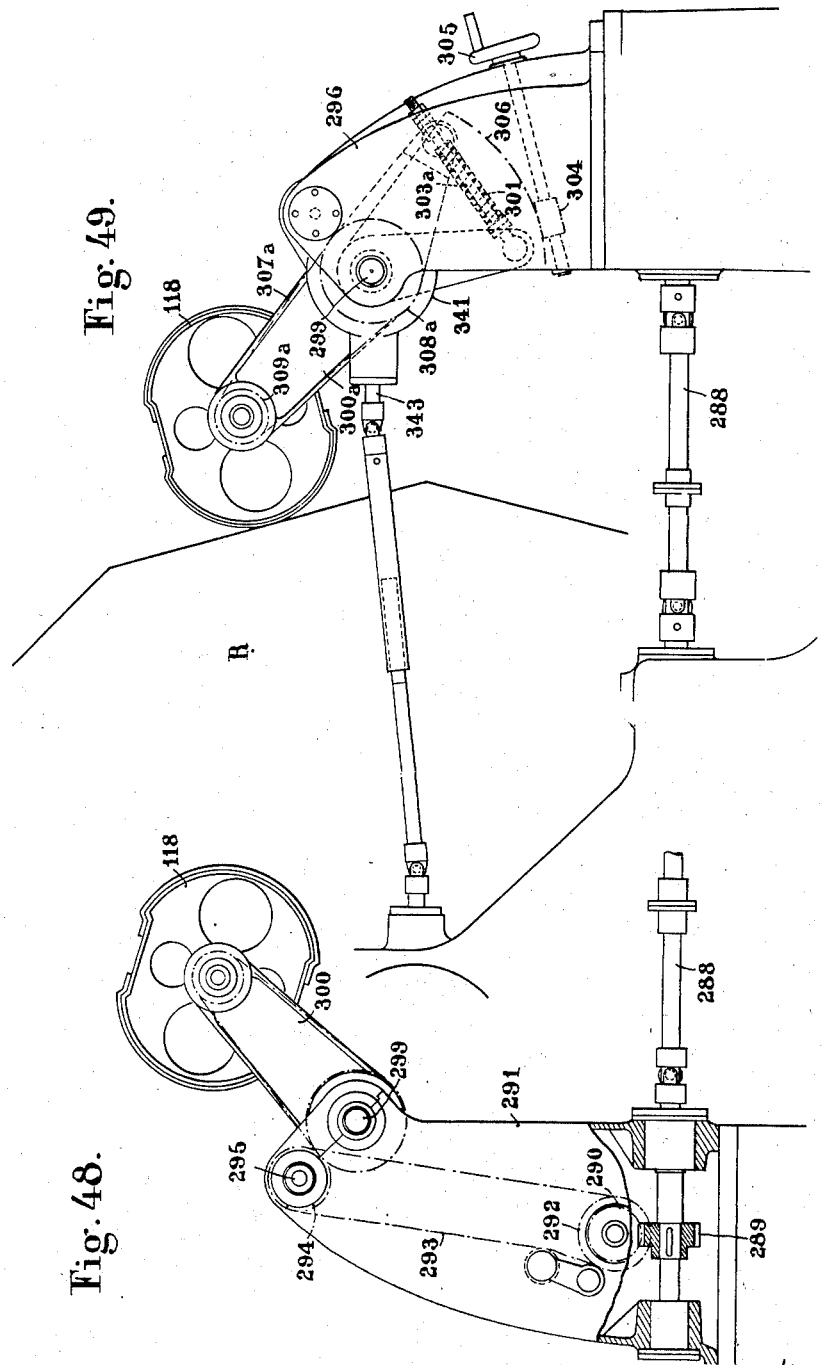
Inventor
Gerard Bardet
By Robert E. Burns
Attorney

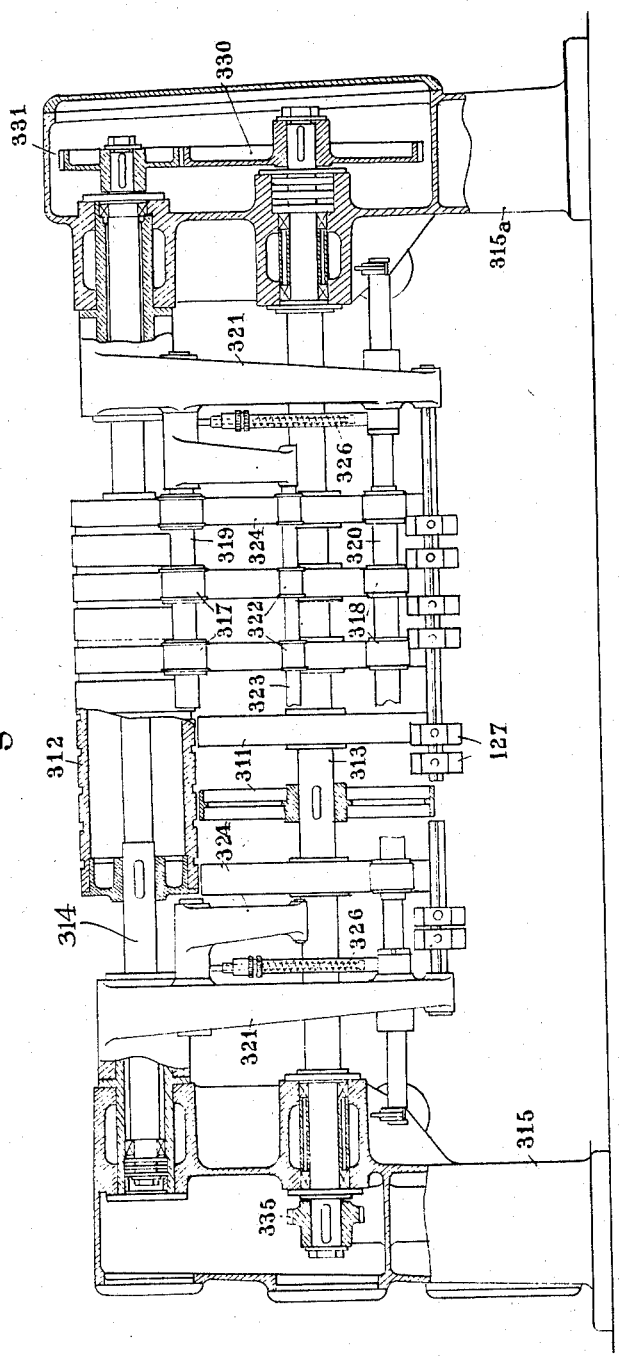

Sept. 9, 1952 G. BARDET 2,609,734
MACHINE FOR VALVING BAG BLANKS
Filed Sept. 16, 1947 31 Sheets-Sheet 28

Inventor
Gerard Bardet
By Robert E. Burns
Attorney

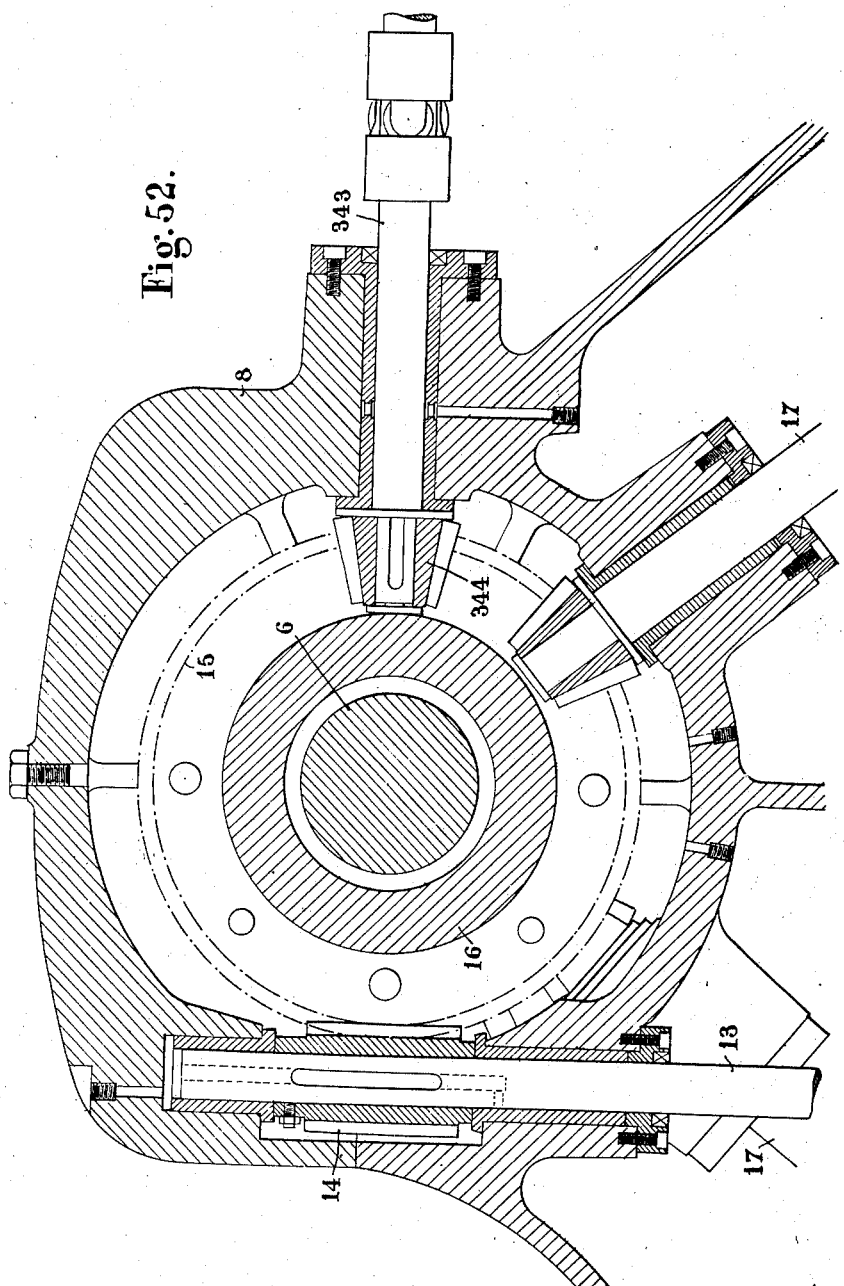

Sept. 9, 1952 G. BARDET 2,609,734
MACHINE FOR VALVING BAG BLANKS
Filed Sept. 16, 1947 31 Sheets-Sheet 30

Inventor
Gerard Bardet
By Robert E. Burns
Attorney

Sept. 9, 1952  G. BARDET  2,609,734
MACHINE FOR VALVING BAG BLANKS
Filed Sept. 16, 1947  31 Sheets-Sheet 31

Inventor
Gerard Bardet
By Robert E. Burns,
Attorney

Patented Sept. 9, 1952

2,609,734

UNITED STATES PATENT OFFICE 2,609,734

MACHINE FOR VALVING BAG BLANKS

Gérard Bardet, Paris, France, assignor to Société Anonyme dite: Machines Automatiques, Bardet, Paris, France Application September 16, 1947, Serial No. 774,301
In France September 29, 1946

11 Claims. (Cl. 93—8)

The machine that forms the subject of the present invention is intended for the manufacture of paper bags of the "Bates" type, that is to say, comprising two closed ends one of which is provided with a tubular element, likewise of paper, for filling purposes which, after the filling, is flattened in such a manner as to close the bag.

This machine is designed with a view to being supplied with unclosed bags prepared by another machine, known by the name of "Tuber," so that it performs the functions of folding the bottoms, sticking them with adhesive, and closing them, after placing upon one of them the tubular filling element, known as a valve or sleeve.

It is designed with a view to obtaining a considerable output, of the order of 240 bags per minute, for example, and comprises for this purpose a series of similar posts or stations, twelve for example, secured to the periphery of a continuously rotating cylinder or barrel, the operations of folding, gumming and closing being entirely effected by suitable mechanisms upon each of these posts. These revolving posts pass successively in front of a plurality of fixed posts: first a feed post, which delivers to each of them a flattened paper tube open at both ends, then a post that furnishes them with a valve, next a gumming post, then one or more pressing posts effecting the breaking of the folds produced by the said mechanisms, and finally a receiving post, which removes the finished bags.

One form of construction of a machine arranged in this way will now be described by way of example with reference to the accompanying drawings, in which:

Figures 1 to 7 illustrate the various stages in the production of a bag,

Figure 1 being a plan of a flattened paper tube composed of three sheets, superposed and folded;

Figures 2 and 3 a transverse section and a longitudinal section respectively of this tube;

Figure 4 a view on a larger scale of a tube of this nature, the ends of which are partly folded to form the bottoms of a bag;

Figure 5 a view of the bag completely folded;

Figure 6 a section on a larger scale of one end of the bag, in which a valve has been inserted; and Figure 7 a perspective view showing the form that the bag assumes when filled.

Figure 8 is a diagrammatic view of the machine in elevation.

Figures 9 to 18 illustrate diagrammatically in perspective the successive stages in the folding of one end of a bag;

Figures 19 to 55 show the various parts of one form of construction of the machine according to the invention:

Figure 19 is a general view of the machine in elevation as seen from the side of its displaceable frame;

Figure 19a is an enlarged view of a portion of Figure 19.

Figure 20 is a vertical section on the axial plane XX—XX in Figure 19, on a larger scale;

Figure 19:
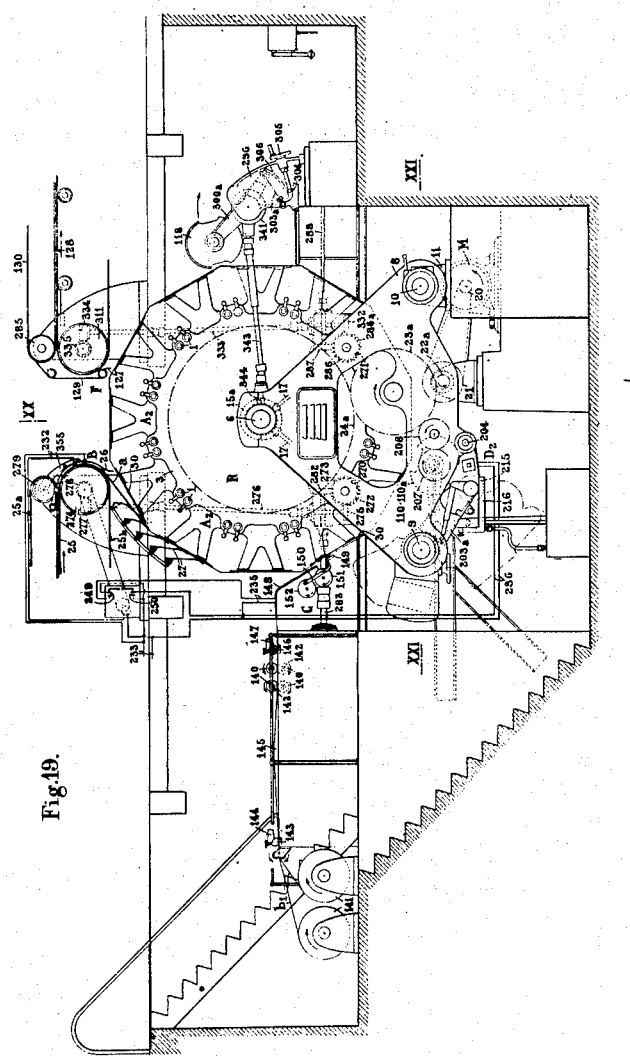
Figure 33:
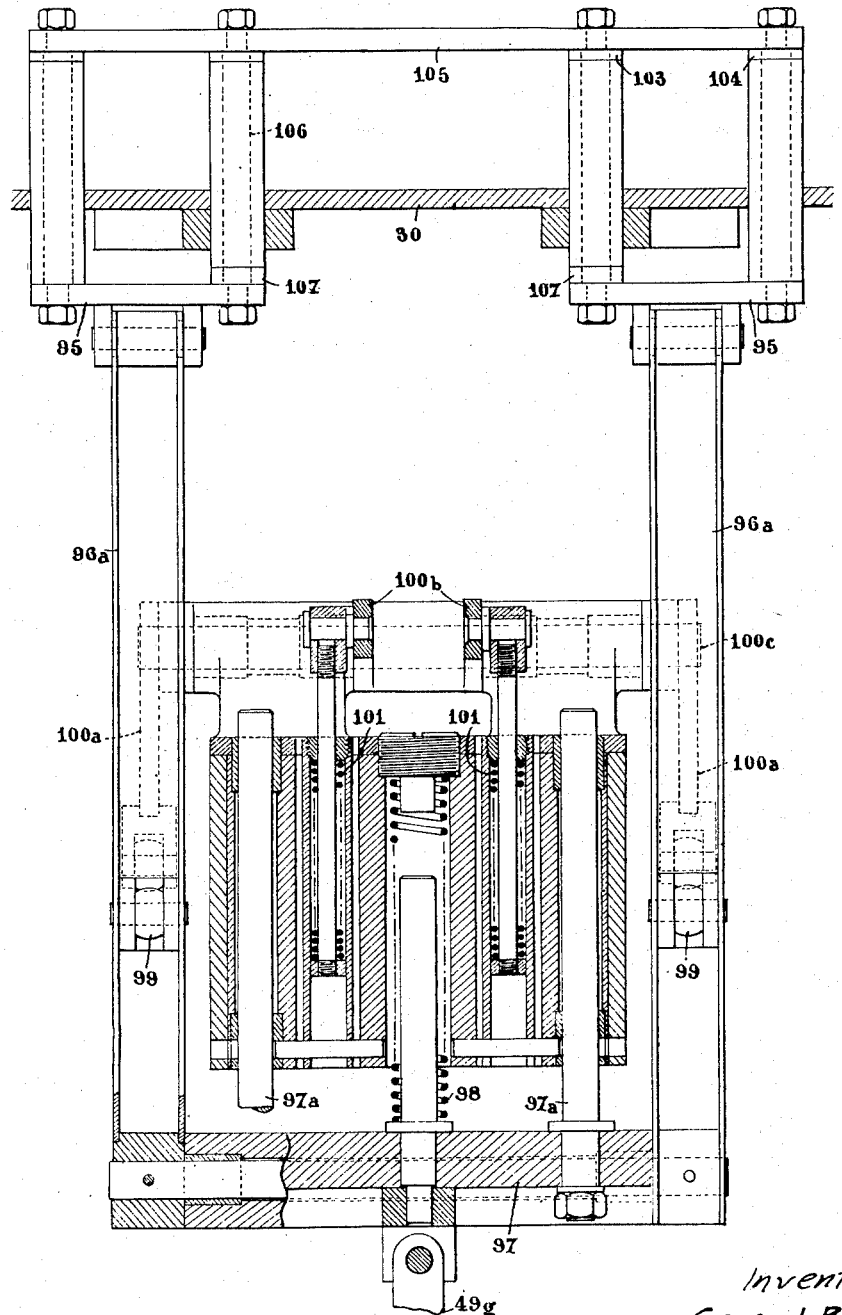
Figure 34:
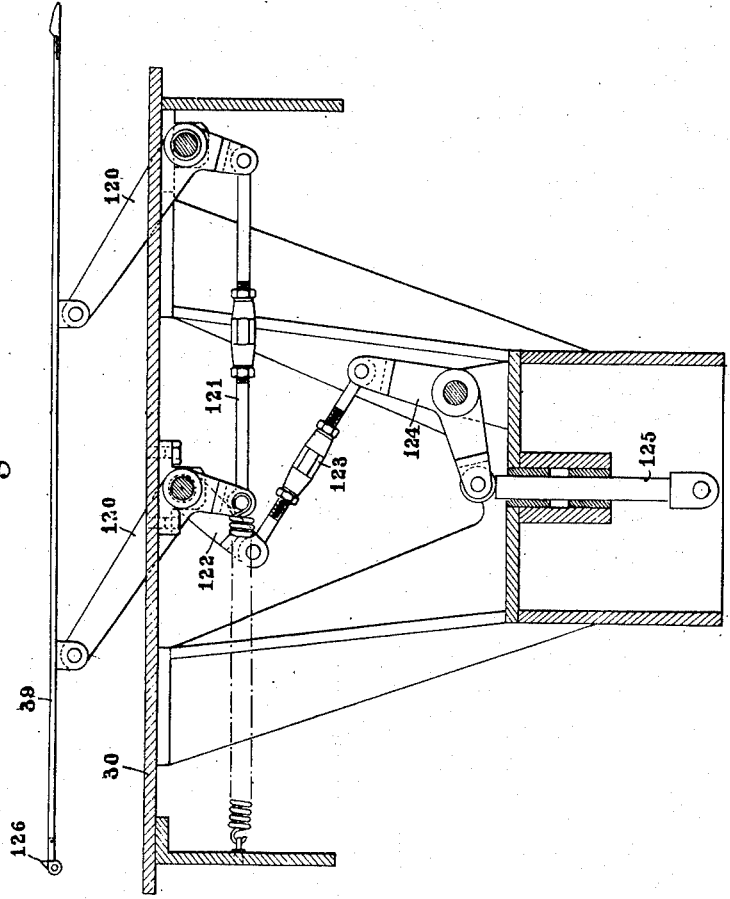
Figure 35:
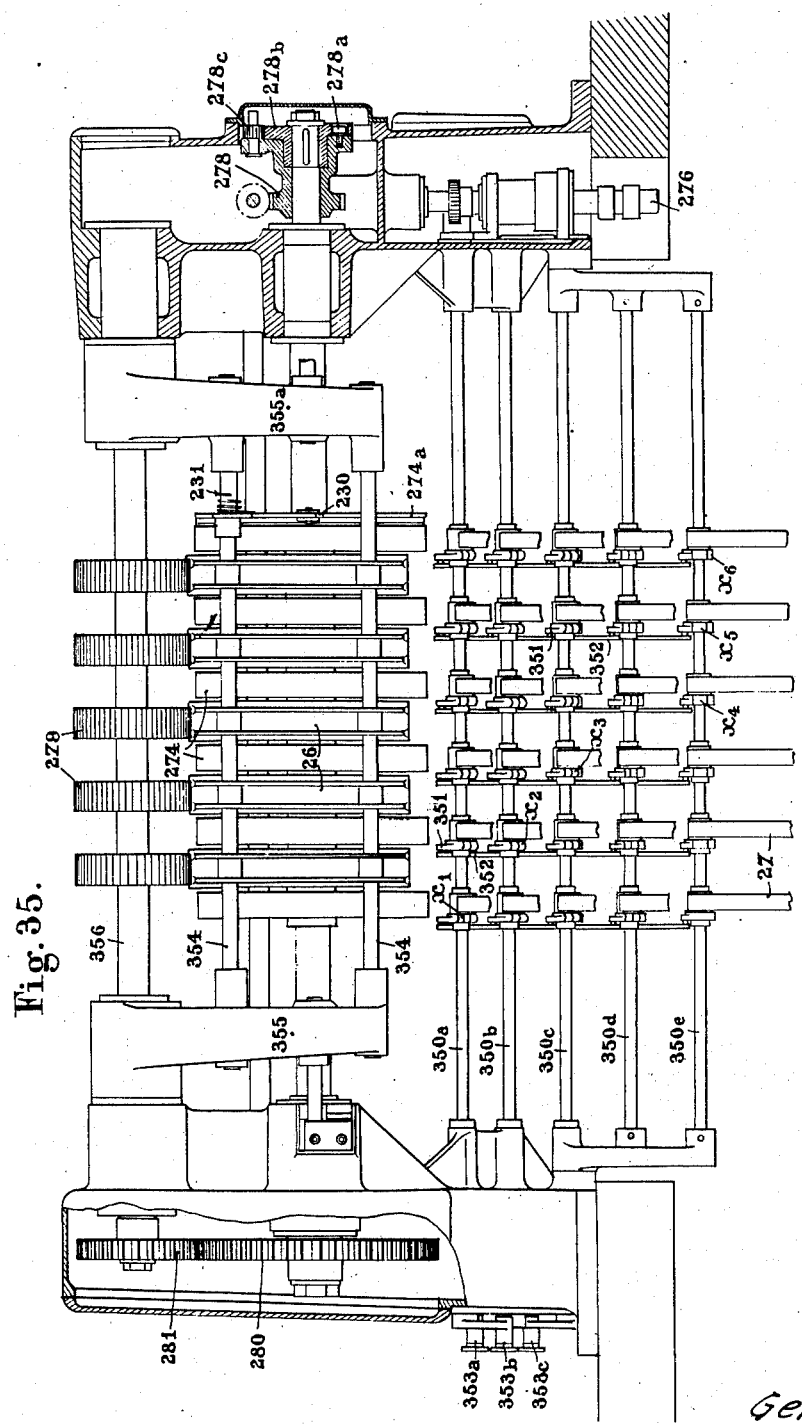
Figure 38:
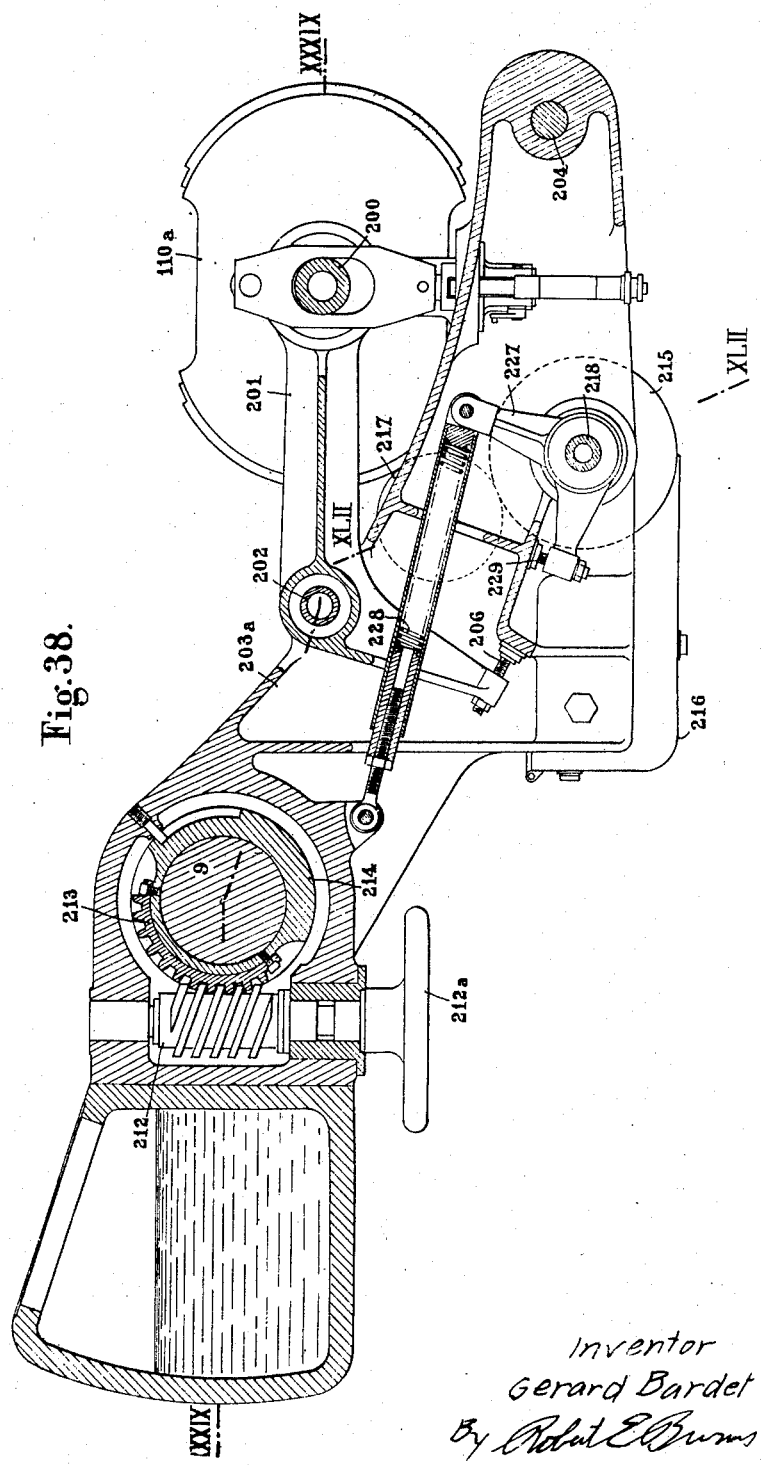
Figure 43:
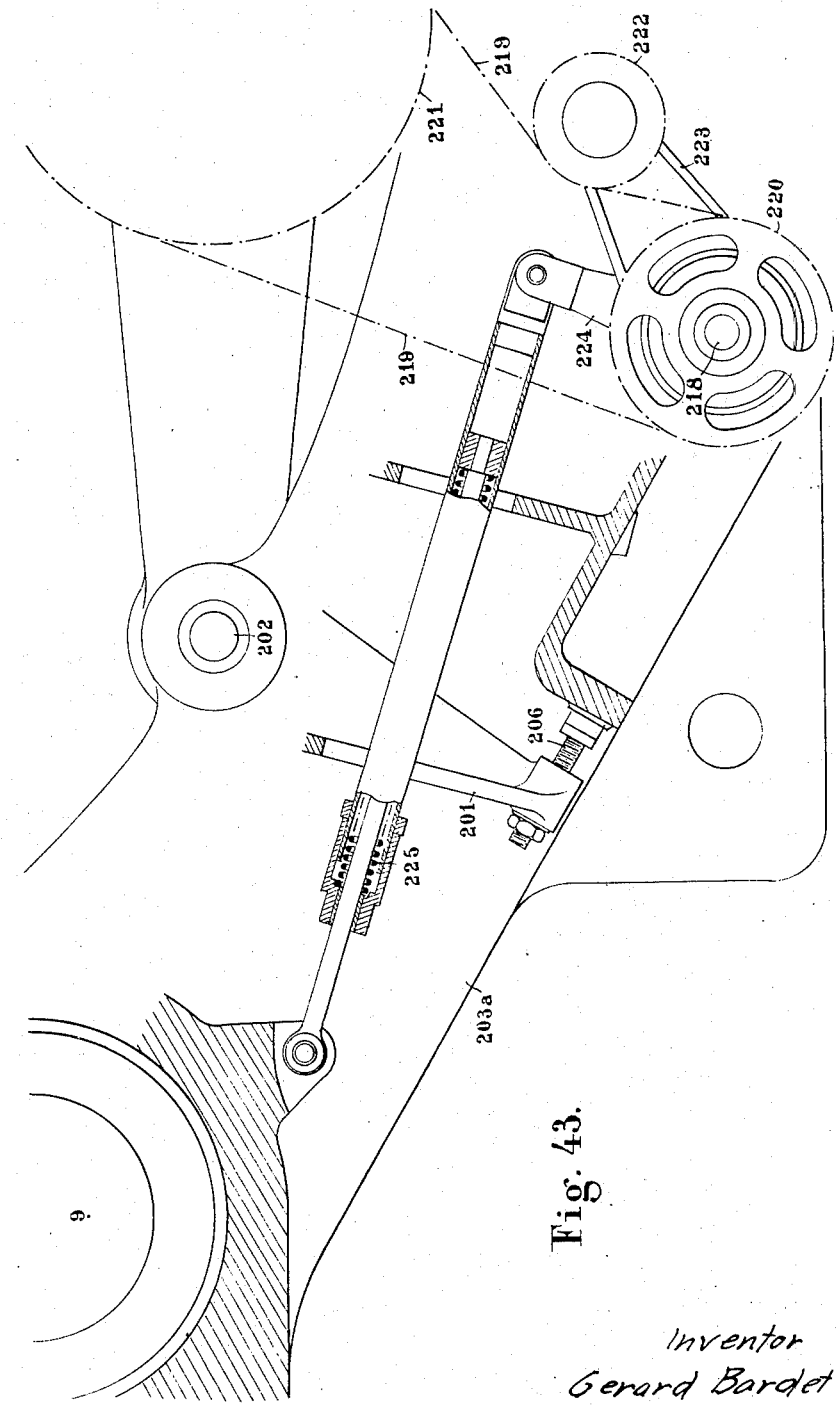
Figure 44:
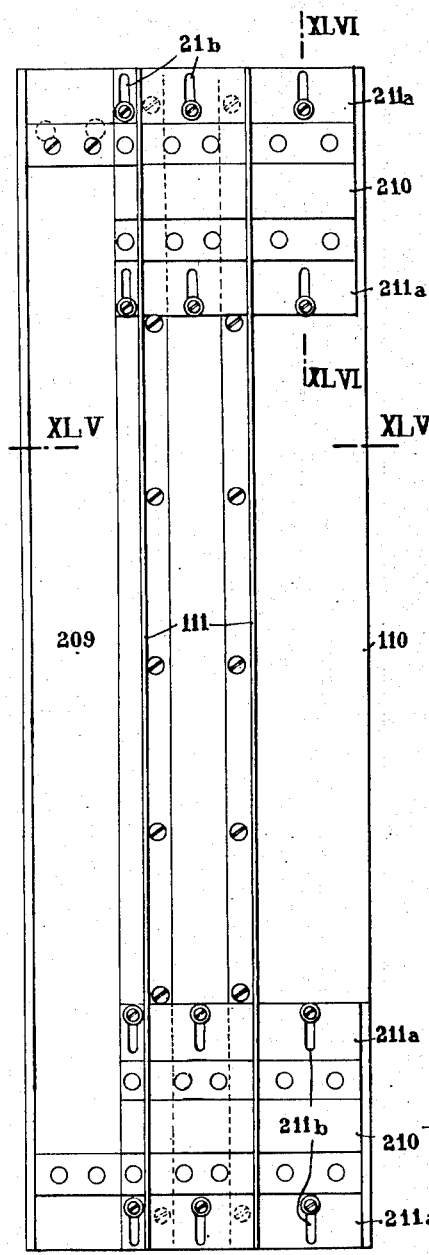
Figure 46:
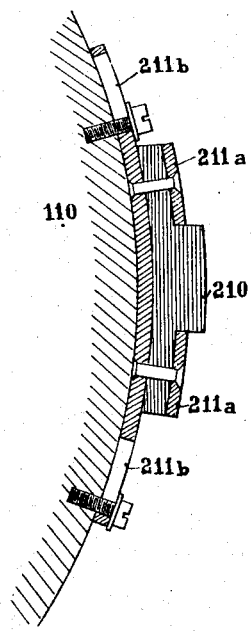
Figure 45:
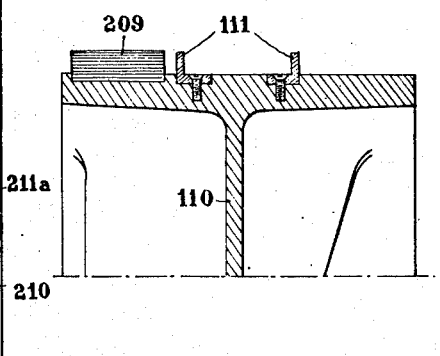
Figure 47:
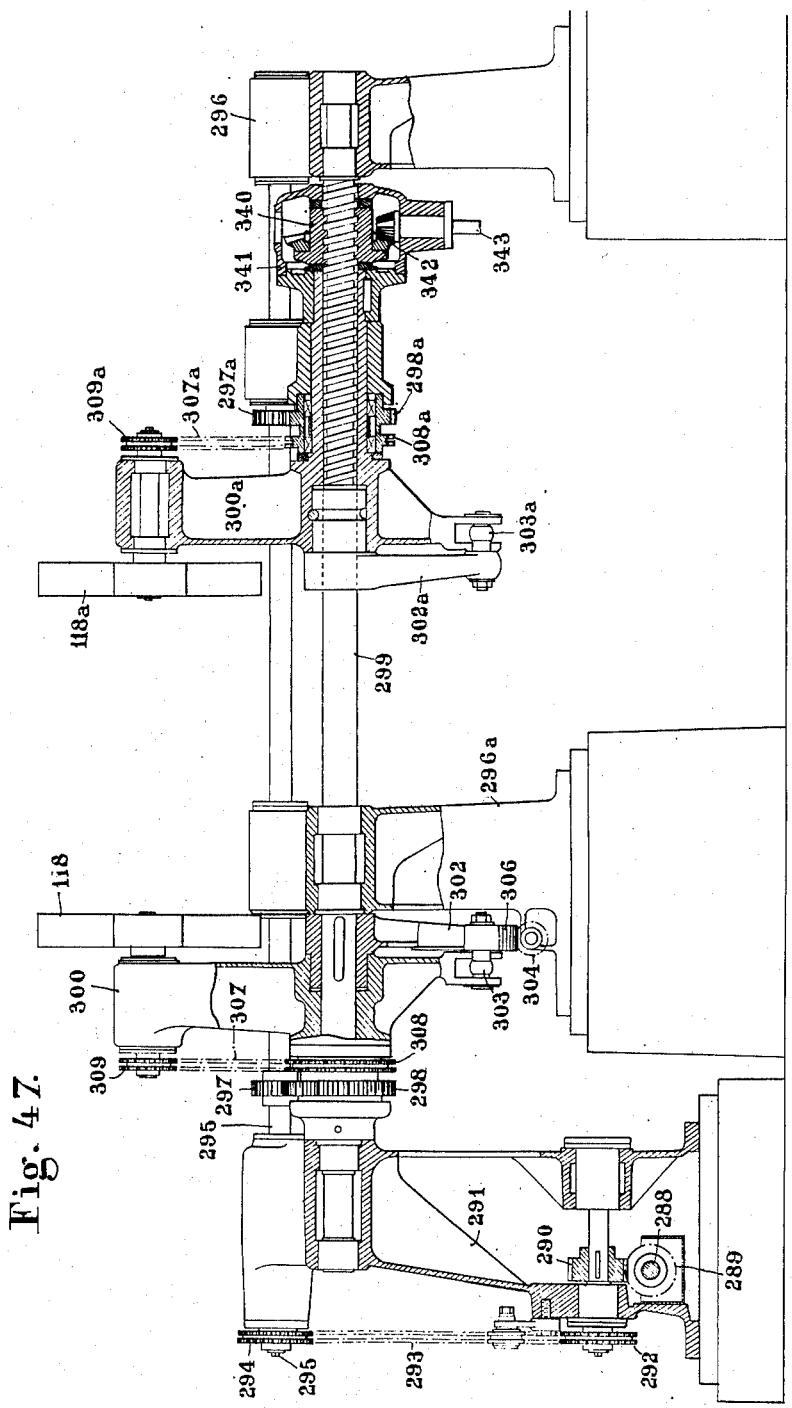
Figure 51:
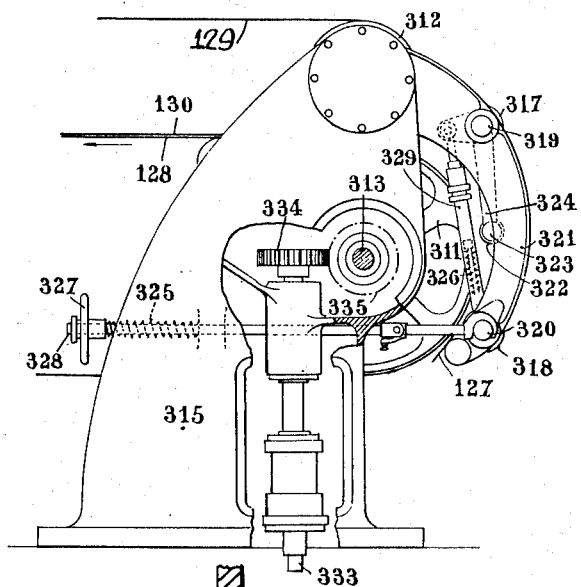
Figure 54:
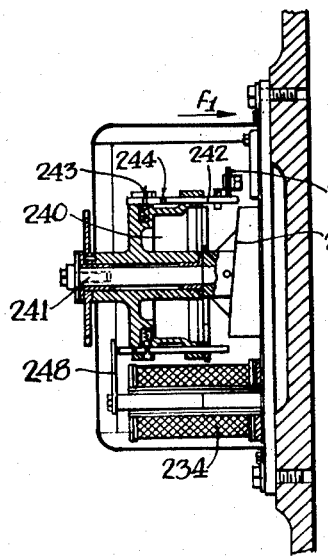
Figure 53:
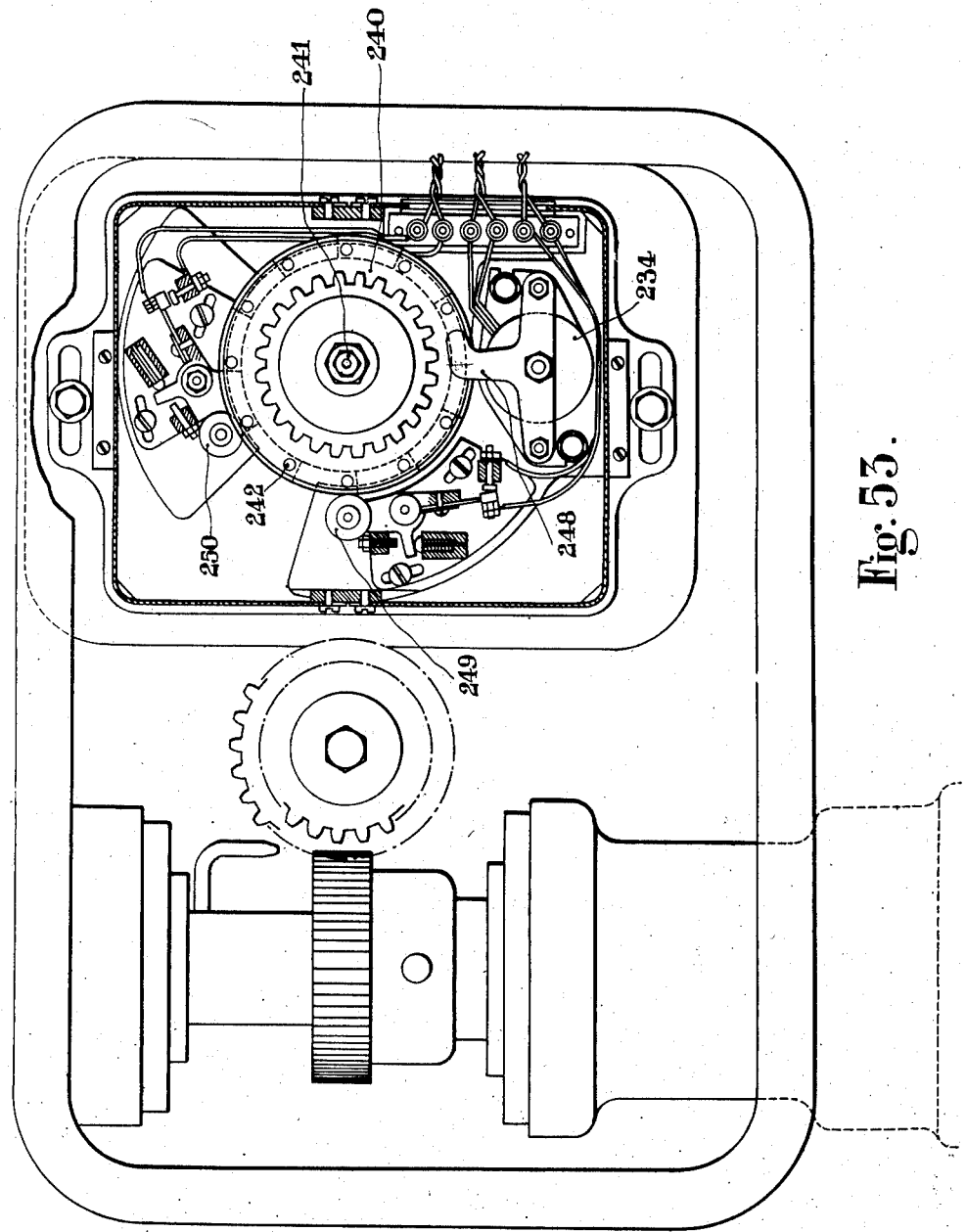

Figures 21a and 21b together constitute a horizontal section on the plane XXI—XXI in Figure 19, likewise on a larger scale;

Figure 22 is a plan from above of one of the folding posts mounted on the periphery of the rotary cylinder;

Figure 23 is a vertical section of this post on the plane XXIII—XXIII in Figure 22;

Figures 24 and 25 are partial sections on the planes XXIV—XXIV and XXV—XXV respectively in Figure 23;

Figure 26 is a vertical section supplementing Figure 23 on a smaller scale;

Figure 26a is a partial cross section on the plane XXVI—XXVI in Figure 26;

Figures 27 and 28 are partial vertical sections on the planes XXVII—XXVII and XXVIII—XXVIII respectively in Figure 22;

Figure 29 is a section on the plane XXIX—XXIX in Figure 28;

Figure 30 is a section on the plane XXX—XXX in Figure 22;

Figures 31 and 32 are sections on the planes XXXI—XXXI and XXXII—XXXII respectively in Figure 30;

Figures 33 and 34 are sections on the planes XXXIII—XXXIII in Figure 22 and XXXIV—XXXIV in Figure 23 respectively;

Figure 35 shows in elevation the post for the introduction of bags, as seen from the interior of the machine;

Figures 36 and 37 are front and back views of this post;

Figure 38 is a vertical section of a gumming post on the plane XXXVIII—XXXVIII in Figure 39;

Figure 39 is a horizontal section of the same post on the plane XXXIX—XXXIX in Figure 38;

Figure 40 is a vertical section on the plane XL—XL in Figure 39;

Figure 41 is a partial section on the plane XLI—XLI in Figure 40;

Figure 42 is a section on the plane XLII—XLII in Figure 38;

Figure 43 shows in elevation, and partially in section, the drive for a gumming roller;

Figure 44 shows a development of a portion of the periphery of a gumming roller;

Figures 45 and 46 show partial sections of this roller on the planes XLV—XLV and XLVI—XLVI respectively in Figure 44;

Figure 47 shows in elevation, and partially in section, the pressing post, as seen from the interior of the machine;

Figures 48 and 49 show this same post in rear and front elevation respectively;

Figure 50 shows in elevation, and partially in section, the evacuation post as seen from the interior of the machine;

Figure 51 shows the rear side of this post in elevation, and partially in section;

Figure 52 shows a partial section on the plane LII—LII in Figure 20;

Figure 53 shows in elevation a detector device serving to arrest the distribution of the valves and the gumming in the event of the supply of bags failing at the distributing post;

Figure 54 shows a section on the plane LIV—LIV in Figure 53; and

Figure 55:
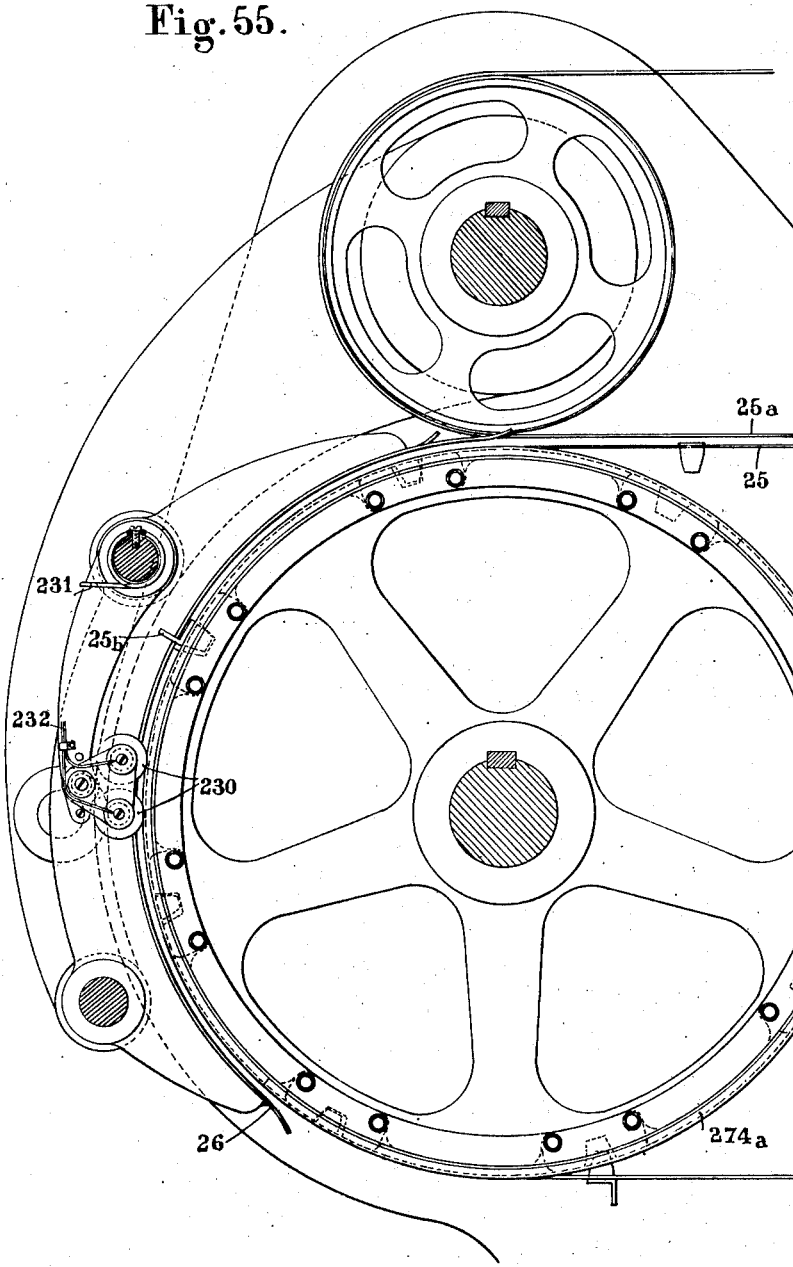

Figure 55 shows in partial elevation the distributing post, as seen from the rear.

Figure 11:
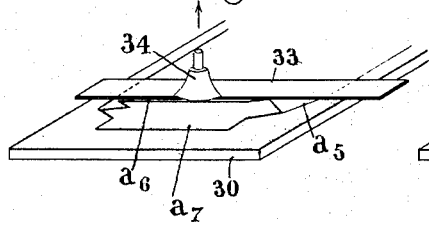
Figure 12:
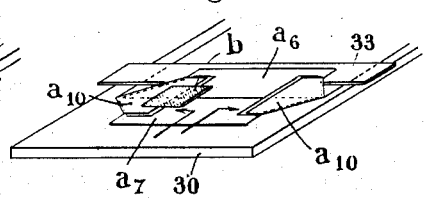
Figure 13:
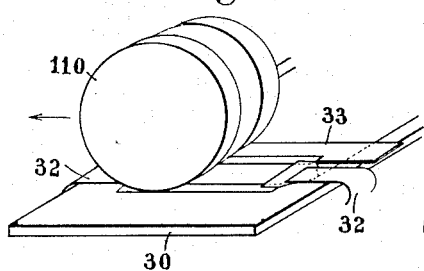
Figure 14:
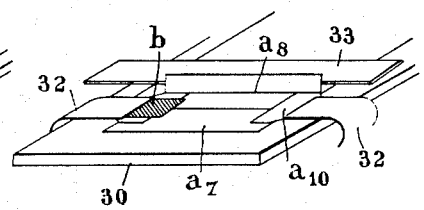
Figure 15:
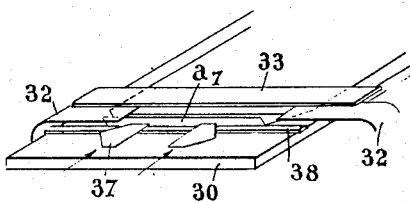
Figure 16:
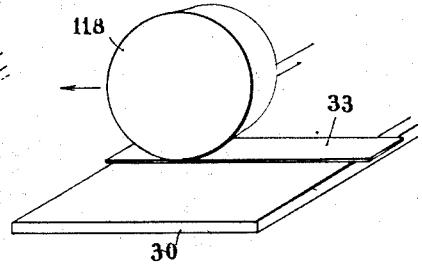
Figure 17:
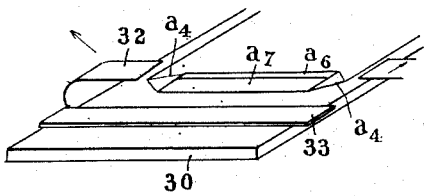
Figure 18:
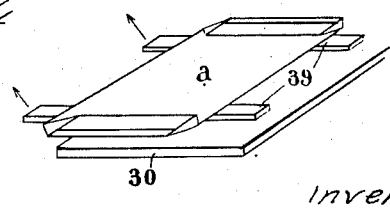

In the drawings (see Figures 8 and 19a), $A_1$—$A_2$ denote movable posts or stations carried by a rotary cylinder or barrel R, upon each of which are mounted the mechanisms necessary for folding and closing the bag bottoms and for fixing the valves. B denotes the feeding post or station, which distributes a flattened paper tube $a$ (Figures 1 to 3), open at both ends, to each of the posts $A_1$—$A_2$ that passes in front of it. C is the post that distributes the valves $b$ (Figures 4, 12 and 19); D is the post that serves to gum the bottoms of the bags; E the post that serves to break the folds of these bottoms and effect the sticking thereof; and at F the finished bags are ejected from the posts $A_1$—$A_2$ and received on a conveyor which carries them to a storage or utilization post.

Each of the tubes $a$ is generally composed of a number of sheets of strong paper, superposed and folded into the form of flat tubes as shown in Figures 1 to 3, so that their junction edges $a_1$, when stuck together, are off-set from one sheet to the next, so as not to form an inconvenient excess thickness. The edges $a_2$, corresponding to the ends of the tube, are cut-out and off-set in relation to one another with a view to enabling the bottoms of the bags to be conveniently formed by folding and gumming.

This folding, as illustrated in Figures 4 to 18, comprises, for each end of the bag, the folding down of one of the faces of the bag upon itself about a crease $a_3$, the folding down of both faces about creases $a_4$, which start from the lateral creases $a_5$ and obliquely rejoin the edges of the wings or lobes $a_6$ and $a_7$ adjacent to the crease $a_3$, which are to constitute the bottoms, and finally the folding down of these wings about creases $a_8$ and $a_9$ upon one another and upon the parts $a_{10}$ included between the creases $a_4$.

At one of the ends of the bag the valve $b$, consisting of a rectangle of paper folded and gummed into the form of a short flattened tube, will be placed on one of the portions $a_{10}$ and covered by the wings $a_6$, $a_7$ (Figures 5 and 6). These wings will have to be stuck to one another and to the parts $a_{10}$, as well as to the valve $b$.

To effect these operations, each of the movable posts comprises two symmetrical parts $A_1$ and $A_2$ (Figure 20), the spacing of which can be modified according to the length of the bags to be made. Each of these parts carries the members and mechanisms necessary for the production of a bag bottom, and they are each fixed in a readily detachable manner by means of spindles 1 to one of the two drums 2 and 3 of which the cylinder R is composed. These two drums revolve together about the hubs of two stationary inner drums 4 and 5, which are mounted upon a shaft 6, the ends of which are supported by frames 7 and 8, shown in Figures 19, 20 and 21. The first of these frames is fixed upon two shafts 9 and 10, resting upon stationary bearings 11, while the second frame 8 is displaceable along the shafts 6, 9 and 10 when it is desired to modify the spacing of the rotary drums 2 and 3 carrying the posts $A_1$ and $A_2$, and also the spacing of the non-rotary drums 4 and 5 which they enclose. These latter drums carry upon their peripheries a series of cams $12a$, $12b$ ... $12k$, serving to actuate the various mechanisms of each post.

The displacement of the frame 8, with its associated drums, along the shafts 6, 9 and 10, is obtained through a rotation impressed by an auxiliary motor N, through the medium of a shaft 13 and reducing gears 14, 15 (Figures 20 and 52), on a nut 16 traveling along a threaded portion of the stationary shaft 6. This movement of rotation is at the same time transmitted by a wheel $15a$, rigid with the gear 15, and through the medium of shafts 17 and gears 18 and $18a$, to nuts 19 traveling along threaded portions of the stationary shafts 9 and 10. In this way it is possible to adjust the spacing of the drums according to the length of the bags, which may range for example from 60 to 120 centimetres.

The cylinder R is rotated by a motor M, through the medium of reducing gears 20, 21, 22, $22a$, 23, $23a$, 24 and $24a$ (Figures 19 and 20), these latter being rigid with the drums 2 and 3, and turning at a speed of 20 revolutions per minute for example.

The blanks for the bags are brought to the revolving posts $A_1$, $A_2$ by conveying means such as live-roller beds or endless belts 25, $25a$ (Figures 19 and 55). The conveyor 25 is composed of metallic straps carrying at regular intervals cross-bars or cleats $25b$, which serve to carry along, and position the bags, keeping them at an appropriate distance apart. The conveyor $25a$ moves at a speed slightly less than that of the conveyor 25, so that the friction that it exerts upon the bags constrains them to bear against the cleats $25b$ located behind them. These bags are thus brought into contact with guiding members 26, and come to bear, one by one, upon the posts $A_1$—$A_2$, as each of them passes beneath these guides. Other guides, consisting of flexible blades 27, ensure the correct application of these bag blanks upon the upper side of the movable posts.

Each of the parts, $A_1$ or $A_2$, of one of these posts, comprises a plane table 30, upon which are located the various members serving to produce the end of the corresponding bag. These members consist of two marginal elements 31, two lateral grippers 32 serving to support the bag upon the table, a cross-bar 33 designed for folding and pressing the wing $a_8$, a movable suction cup 34, which comes into contact with the top of the bag, a pump 35 for producing a vacuum in the said suction cup, two stationary suction cups 36 designed to keep the underside of the bag pressed upon the table, shaping members 37 of angular form designed for forming the oblique creases $a_4$, a bar 38 normally lodged in a groove in this table and designed for raising one of the end portions of the bag, and an extraction bar 39 which is normally flush with the upper surface of the table, and which is raised, when the bag is completed, in such a way as to engage the latter in the evacuation post F.

The position of the bag arriving upon the tables of a post is ensured in the longitudinal direction, parallel to the axis of the cylinder, by the marginal elements 31, shown in Figures 22 to 27. These elements slide in guides 31a, and are actuated from stationary cams 12a rigid with the corresponding drum 4 or 5, through the medium of a lever 40 fixed upon a shaft 41, levers 42 connected by links 43 to other levers 44, which are rigid with the levers 45 that carry the marginal elements along. The shaft 41 is urged to revolve in one direction by the action of a spring 47, and in the opposite direction by a push member 48 which is guided in the frame of the half-post $A_1$ or $A_2$, this push member being connected by a link 49a to a lever 50a, which oscillates about a stationary pivot 51, and which bears by a roller 52 upon the fixed cam 12a.

The marginal elements situated upon the two tables 30 of a post are displaced towards one another when the rollers 52a of this post, as a result of the rotation of the cylinder 2, 3, arrive upon the large-radius portion of the cam 12a.

The bag thus centered upon the tables by the marginal elements is then held in place by the grippers 32. These are fixed upon movable supports 53 (Figure 28), guided beneath the table 30 by inclined slideways 54, and connected by links 55 to levers 56, which are coupled by means of toothed sectors 57. One of these levers is rigid with a lever 58 carrying a roller 59, which bears, under the action of a spring 60 connecting the two levers 56, upon a push member 61. This push member is connected by a link 49b (Figure 26) to a lever 50b which oscillates about the piovt 51, and which bears by a roller 52b upon the stationary cam 12b of the drum 4 or 5. The cams 12b are so profiled as to produce a lowering of the grippers on to the bag as soon as its correct position upon the tables 30 has been ensured by the marginal elements.

The cross-bar 33 then takes up a position upon the first crease and grips the bag. This cross-bar is fixed at each end upon a support 65 (Figures 23 and 28), connected by levers 66 and 66a to a movable piece 67, guided vertically in the frame of the half-post $A_1$ or $A_2$, and urged downwards by the action of a spring 68. The two parallelograms formed by the pieces 65, 66, 66a and 67 can oscillate laterally under the control of a double lever 69, oscillating about a fixed pivot 70, and having one of its ends connected to the levers 66a by links 71, while its opposite end is pressed by the action of springs 72 upon pistons 73, sliding vertically in the frame. The pieces 61 and 73 are connected by links 49c and 49d to two levers 50c and 50d, controlled by the cams 12c and 12d respectively. The movements impressed upon the articulated parallelograms and upon the cross-bar 33 by virtue of this mechanism are such that the cross-bar advances above the bag as soon as the latter is put in position upon the table 30, and descends at the same time so as to grip this bag with a pressure which depends upon the force of the springs 68 and 72.

The movable suction cup 34 is fixed to one end of a bent tube 74 (Figure 23), the opposite end of which is mounted upon a box 75, articulated upon a lever 76. This lever pivots about a stationary pin 77, and is connected by a link 78 to another lever 79, bearing through the medium of a roller 80 upon a rod or piston 81 sliding vertically in the frame. This piston 81 is connected by a link 49e to a lever 50e, controlled by the cam 12e. In addition to the ascending and descending movement that this mechanism impresses upon the box 75 when the roller 52e moves around the stationary cam 12e, this box receives an oscillating motion in relation to the lever 76 as a result of the guidance of a roller 82, mounted upon it, in a slideway 83 of suitable form, fixed to the frame of the half-post $A_1$ or $A_2$. The suction cup 34, normally raised above the table 30 to permit the bag to be placed in position, is in this way lowered at the requisite moment on to the end $a_6$ of this bag for the purpose of subsequently raising it.

A suction is then created in this suction cup by the pump 35. The piston 90 of the latter is urged downwards by the action of a spring 91, and its rod is connected by a link 49f to a lever 50f controlled by the cam 12f, so that when the roller 52f passes over a low portion of this cam, the piston 90, urged by the spring 91, sucks out the air in the suction cup 34 through the tube 74, the box 75 and a connection 92 connected to this box by a flexible tube, not shown.

This pump at the same time produces a vacuum in the stationary suction cups 36 embedded in the table 30 for the purpose of retaining the underside of the bag.

While continuing to roll along cam 12f, the roller 52f is pushed away, and the suction cup 34, through the medium of the mechanism described above, is raised, carrying with it the upper wing $a_6$ of the bottom of the bag.

Into the end of the bag thus opened, the shapers 37 now penetrate. These consist of plates of angular form (Figure 22) fixed to movable cross-bars 94, the control of which is analogous to that of the cross-bar 33. These cross-bars, as shown in Figures 22, 23 and 33, are supported by articulated parallelograms 95, 96, 96a, 97, the lower side of which, guided vertically in the frame by rods 97a, is pushed downwards by a spring 98, and can be raised by a link 49g, a lever 50g and a roller 52g carried thereby, which rolls upon the stationary cam 12g. These parallelograms also receive a motion of oscillation owing to the fact that the levers 96a are connected by links 99 to levers 100a and 100b fixed upon a shaft 100c, and the lever 100b bears, under the action of springs 101, upon a push member 102, which is raised when a lever 50h passes over a projecting portion of the stationary cam 12h, this lever being connected to the piston by a link 49h. This mechanism has the effect of impressing upon the supports an up-and-down movement and a horizontal displacement in the direction of the length of the bag in process of manufacture. The shapers however should also receive supplementary movements in the transverse direction, in such a way that they move away from one another when once they are engaged in the bag, and then approach one another again in order to come out of the bag. These movements are possible by virtue of the connection of the supports 94 with the upper elements 95 of the vertical parallelograms 95, 96, 96a, 97 by other articulated parallelograms arranged horizontally, as shown in Figure 22. The cross-bars 94 are in fact connected by links 103 and 104 to a common cross-bar 105, which is rigid with the elements 95. On each side of the table 30 the link 103 has a certain lateral clearance in relation to the cross-bar 94, and is connected by its vertical pivot 106 to a lever 107, the end of which, provided with a roller 108, is guided in a slide-way 109 formed in the table. These slideways are of such a shape that when the shapers penetrate into the bag the said shapers remain at first close to one another, and then move asunder when their lateral points arrive at the place where the creases $a_4$ are to be formed. The shapers then approach one another and return to their starting point.

When the moving post in question passes before the post C the latter puts in position, as will be hereinafter described, a valve $b$ upon one of the tabs $a_{10}$ that have just been formed. The grippers 32, previously separated to enable the valve to be placed in position, will immediately grip the bag on to the table 30 by bearing upon the tabs and upon the valve.

The cross-bar 33, controlled as described above, had been withdrawn from beneath the wing $a_6$. It then takes up a position on the edge of this wing, and then, when the bag passes in front of the post D, the roller 110 carrying marking angles 111 (Figures 44 and 45) gums the edges $a_{11}$ of the sheets constituting the underside of the bag, and marks the inner and outer creases $a_8$ and $a_9$ so as to facilitate the formation thereof.

The cross-bar 33 then rises, and raises the free portion of the wing $a_6$, after which it returns slightly rearwards and downwards, thereby folding down this free portion about the crease $a_8$ and holding it pressed upon the crease $a_3$.

At this moment the raising bar 38 (Figures 22, 30 and 31) leaves its cavity in the table 30 in order to raise the outer wing $a_7$ about the crease $a_9$. This bar is in fact supported by two levers 112, fixed upon a pivot 113 and connected by a forked rod 114 and a cheek or housing 115 to a push member 116, which is urged downwards by springs 117, but which is normally raised by the lever 50j connected to this piston by the link 49j and bearing elsewhere upon the cam 12j. When this cam permits the lever 50j to descend, the levers 112 rock under the action of the springs 117, and raise the bar 38.

The shapers then advance and descend in such a manner as to lower and press the raised portion of the wing $a_7$ on to the portion previously folded down of the wing $a_6$, so that the gummed edges of the first are pressed against the second.

The cross-bar 33 is then displaced rearwards, and covers the entire bottom of the bag thus closed. The final formation of the latter is effected by its passage beneath the pressing roller 118 of the post E, which bears upon the cross-bar 33 and thus completes the breaking of the folds.

In the succeeding portion of the travel of the movable post under consideration the cross-bar 33 recoils further and liberates the bag, the grippers 32 move away and leave this bag quite free upon the table 30. It is then raised by the extraction bars 39 (Figures 34), which are supported, between the tables 30 of the half-posts $A_1$ and $A_2$, by levers 120 articulated to these tables and connected with one another by links 121. One of these levers upon each half-post is connected by a lever 122 and a link 123 to another lever 124, which bears upon a push member 125, connected in its turn by a link 49k to the lever 50k controlled by the cam 12k of the corresponding stationary drum. The bag is thus removed from the tables 30 which were supporting it and is pushed by spurs 126 provided upon the bars 39 in such a way that it slides over inclined blades 127 and becomes engaged between the endless conveyors 128 and 129 of the evacuation post F, which draw it along towards a receiving post, not shown.

It is to be observed that all the members serving to exert any pressure or thrust upon the bags while they remain upon the cylinder R are displaced in the gripping direction by the action of springs, and are not actuated in a rigid manner except in the releasing direction. It follows that all risk of jamming or breakage of parts as the result of an accidental accumulation of bags or of sheets upon the movable posts is thus obviated.

Other arrangements relating to safety will be indicated after the description of the stationary posts, together with various details relating to the actuation of the mechanisms and to the adjustments necessitated by changes in the dimensions of the bags.

The post C, at which the valves $b$ are made, comprises driving rollers 140 (Figure 19) arranged in pairs and pressed resiliently upon the paper strip $b_1$, which passes between them, and unwinds from one of the spools 141. These rollers are frictionally driven by means of their shafts 142, the rotation of which is rigidly connected to that of the cylinder R. This strip passes first beneath a gumming roller 143, supplied from a tank 144 so that a layer of adhesive is deposited upon one of the edges of the strip. The latter is then rolled up by passing through a channel 145, which progressively raises its edges and lowers the gummed side on to the opposite side so as to form a tube. This tube is immediately flattened on passing between the rolls 140, and then its upper face is coated with adhesive by a second gumming roller 146, supplied with gum by a tank 147.

Knives, not shown, one of which is actuated periodically, cut this tube into segments. Each segment constituting a valve $b$ is carried through an inclined channel 148 on to a blade 149, which serves to transport this valve and to press it on to the bag carried by the post $A_1$, $A_2$, which is passing at this moment before the post C. This blade 149 is resiliently supported by a cross-bar 150, articulated upon two rotary plates 151 and 152, so as to receive a continuous movement of circular translation. The extremity of the channel 148 and the blade 149 are cut out into the shape of combs or hands, so that the fingers of the blade can ascend between those of the channel for the purpose of raising the valve and then pressing it upon the corresponding bag.

The frictional coupling of the rolls 140 with their shafts 142 is controlled by an electromagnetic device, and can be uncoupled by a suitable detector whenever a movable post is on the point of passing in front of the post C, as will be hereinafter described.

The post D (Figures 38 to 46) serving for gumming the ends of the bags, comprises, for the purpose of supporting the shaft 200 of each of two gumming rollers 110 and 110a, a lever 201, which can oscillate about a pivot 202 mounted upon a support 203 or 203a. The latter is maintained fixed upon the corresponding frame 7 or 8, on one side by means of the shaft 9, and on the other side by means of a pivot 204, which can easily be displaced when it is desired to remove the roller 110 or 110a from the cylinder R.

Each of the levers 201 is suspended upon the support 203 or 203a by two springs 205, which tend to keep it pressed against a displaceable stop 206 mounted upon the said support. The roller can thus yield resiliently downwards to the passage of the angles formed by the unit composed of the posts $A_1$ and $A_2$, but cannot engage in the intervals between the latter. Moreover the profile of the roller is related to the form of the polygonal contour of this composite post unit in such a way that the vertical displacements of the shaft 200 will be of small amplitude, for instance of 25 millimeters.

Each roller 110 or 110a has a motion of continuous rotation due to a toothed wheel 207, which is rigid therewith, and which meshes with a pinion 208 mounted upon the frame 7 or 8, and itself meshing with the toothed wheel 23 or 23a. These gears are so selected that the circumferential speed of the roller will be equal to that of the bags to be gummed.

The position of the pinion 208 in relation to the wheel 207 is so determined that the displacements of the latter, as the angles, faces and hollows of the polygonal contour formed by the composite post unit pass over the roller, do not impair the continuous engagement of these gears.

In order to deposit the adhesive at the desired places upon the bags, each roller 110 or 110a (Figures 44 to 46) carries elements 209, 210 of suitable pliable material, so arranged that the first applies a strip of adhesive to the outer edge $a_2$ of the bag, and the others apply two strips of adhesive perpendicular to the aforementioned strip, and extending over the tabs $a_{10}$. These elements are fixed on to plates 211 and 211a, which are themselves fixed on to the roller by screws. The plates 211a comprise, for the passage of these screws, holes 211b, which enable the spacing of the gumming elements 210 to be regulated according to the width of the bags. Upon the periphery of the roller are furthermore fixed the marking angles 111, which serve to mark upon the bags the creases $a_8$, $a_9$. Each of these angles consists of a curved angle bar fixed by screws to the roller in such a way that its outer edge is parallel to the gumming element 209 and is suitably spaced away from the latter. The elements 210 are spaced as shown in Figure 44, in order to permit these angles to extend throughout the length of the wings $a_6$ and $a_7$ of the bottoms of the bags.

The distance separating the two gumming rolls 110 and 110a varies at the same time as the distance between the cheeks 7 and 8 and between the coupled half-posts $A_1$ and $A_2$ whenever the length of the bags to be produced varies. On the other hand these rollers can be kept spaced away from the cylinder, for instance when it is desired to replace the posts $A_1$ and $A_2$ by other similar posts of greater or less breadth in the direction of the rotation of the cylinder, according as the bags to be produced are themselves to be of greater or less breadth. For this purpose each support 203 or 203a (Figures 21 and 39) comprises a disappearing control 212, manipulated by means of a hand wheel 212a, and meshing with a toothed sector 213, fixed to a sleeve 214, which surrounds the shaft 9 and which is rendered rigid with the frame 7 or 8.

Each roller 110 or 110a is supplied with adhesive by means of a roller 215 in contact with the adhesive contained in a tank 216, and through the medium of a roller 217 which is continuously in contact with the roller 215, and against which the elements 209 and 210 of the roller press. The tank 216 is fixed to the support 203 or 203a, and the roller 215, the shaft 218 of which is supported by the lateral walls of this tank, constitutes one of the end walls of the latter. Sufficient fluid-tightness is obtained by means of circular grooves formed upon the roller and sliding upon the curved edges of the side walls of the tank.

The rotation of the roller 215 is brought about by means of an endless chain 219 passing over a wheel 220 fixed upon the shaft 218, and over a wheel 221 fixed upon the shaft 200 of the roller 110 or 110a. The chain 219 is kept constantly taut notwithstanding the oscillations of the roller 110 by means of an idle pulley 222 carried by a lever 223, which pivots freely upon the shaft 218, and which is rigid with another lever 224, subjected to the action of a return spring 225.

The intermediate roller 217 is supported by a lever 226, mounted freely upon the shaft 218, and rigid with a lever 227, which is continuously urged by a spring 228 in such a way that this roller 217 constitutes a resilient support for the gumming roller 110 or 110a. The displacement thereof under the action of the spring 228 is moreover limited by means of an adjustable stop 229, mounted upon the bent lever 227. The gumming post comprises a safety device which prevents the roller 110 from depositing adhesive upon the tables 30 of the cylinder when these tables have not received bag blanks in passing before the feed post B. This device comprises, on the one hand, means adapted to keep the roller 110 spaced away from the cylinder, when, after having been pushed away by the edge of a table carrying a bag, it would be ready to be pressed, under the action of the spring 205, on to a succeeding table not bearing a bag, and on the other hand, electromagnetic control means functioning at the desired moment, after the absence of a bag at a preceding point of the travel has been automatically disclosed, so as to cause the said retaining means for the gumming roller to come into action. In the example illustrated, the absence of a bag has the further result of arresting the distribution of valves at the post C. With this end in view two little wheels 230 (Figures 19 and 53 to 55) supported by the guiding device 26, are placed in front of a metallic detection drum 274a associated with the drums 274 which support the supply conveyor 25, and a spring 231 presses these wheels against the detector drum when there is no bag interposed between them. These wheels 230 are connected by an electric circuit 232 to a source of current at 233. Into this circuit is introduced an electromagnet 234, in such a way that the latter is excited when the wheels 230 come into contact with the drums 274a. This electromagnet 234 then acts upon a recording device, which serves to close in succession two circuits 235 and 236, including electromagnets which, being excited, arrest at the desired moment the distribution of the valves and the functioning of the gumming roller 110 respectively.

This recording device may consist for example of a small cylinder 240 revolving about a fixed pivot 241 at the same speed as the cylinder R carrying the posts $A_1$ and $A_2$ revolves about its axis (Figs. 53 and 54). Upon this cylinder 240 are mounted twelve rods 242, which are capable of sliding parallel to the pivot 241 and of being retained in two different positions by virtue of grooves 243 and 244, in which there engage alternatively balls subject to the action of springs.

At each revolution of the cylinder, the rods are pushed away by a stationary ramp 247, in such a way that they occupy the position indicated at the bottom of Figure 54 when they arrive in front of a movable plate 248, which is rigid with the armature of the electromagnet 234. So long as this electromagnet is not excited, that is to say, so long as the posts passing in front of the wheels 230 are provided with bags, the electromagnet 234 remains inoperative; but when the electromagnet is excited as a result of the absence of a bag, its armature is attracted, and pushes the corresponding rod in the direction of the arrow $f_1$. In its new position this rod, after the cylinder 240 has rotated through an angle equal to the angular distance between the wheels 230 and the post C, comes into contact with a contact member 249, which closes the circuit of the electromagnet that suspends the distribution of the valves $b$. After a further rotation of the cylinder 240 corresponding to the angular distance between the posts C and D, the same rod acts upon a second contact member 250, which closes the circuit of the electromagnet 238 (Figure 40), so that the latter acts upon a clutching device adapted to keep the gumming roller 110 away from the path of the tables 30.

This clutching device comprises a rod 251 sliding in a guide 252, which, like the electromagnet 238, is fixed upon the lever 201. This rod is articulated at 253 upon a housing 254, which can itself slide vertically upon the shaft 200 of the roller 110 due to grooves formed in the cheeks of this housing. A spring 255 supported underneath the guide 252 tends to lower the rod 251, with the housing 254, and consequently to press upon the shaft 200 a little wheel 256 mounted in the upper part of the latter. Upon the rod 251 is formed a notch 257 designed to receive the nose of a pawl 258 mounted upon a pivot 259 fixed to the lever 201 and connected by an articulation to the armature 260 of the electromagnet 238.

So long as this armature remains released from the electromagnet under the action of a spring 261, the pawl remains spaced away from the sliding rod 251, and consequently leaves the lever 201 free to move under the alternate thrust of the springs 205 and of the tables 30. When on the other hand the electromagnet 238 attracts the armature 260, the pawl 258 bears against the rod 251, yielding resiliently by virtue of the intervention of a spring 262, and then engages in the notch 257 so that it keeps the rod lowered, and consequently prevents the roller 110 from depositing adhesive upon the tables 30 so long as the latter are not provided with bags.

Of course a similar safety device is provided upon each of the half-posts $D_1$ and $D_2$.

The transmissions effecting the movements of rotation of the parts of the various stationary posts B, C, D, E and F are associated with the control of the cylinder R. To this end the wheel 24 actuates two pinions 270 and 271 supported by the stationary frame 7. The pinion 270 is virtually integral in rotation with two helical pinions 272 and 273, the former of which actuates the drums 274 of the introduction conveyor 25 through the medium of a pinion 275, a shaft 276 and a pair of pinions 277 and 278. The drum 279 of the conveyor 25a is coupled with the foregoing by gears 280 and 281. These two drums are constituted by two series of pulleys, the positions of which are alternate as shown in Figure 35.

On the other hand the pinion 273 actuates the mechanism C through the medium of a pinion 282, a shaft 283, and pinions not shown. It is possible to regulate as required the angular position of the supply drums 274 in relation to the cylinder R, in order that the bags may be deposited correctly upon the tables 30. To this end the helical pinion 273 which actuates the shaft of the drums 274 is fixed by a locking screw 278a against a disc 278b, which is keyed on to this shaft. A small pinion 278c mounted upon the pinion 278 meshes with the disc 278b and can be operated, when the screw 278a has been unlocked, in such a way as to modify the relative angular positions of these members, and in this way to regulate the angular positions of the supply drums in relation to the general control, and consequently in relation to the cylinder R.

The actuation of the gumming mechanism D has already been described.

As regards the actuation of the pressing rollers 118 and 118a and of the evacuation drums 284 and 285, this comprises two pinions 286 and 286a (Figures 47 and 48), rigid in rotation with the pinion 271. The former drives, through a pinion 287, a shaft 288 and a pair of pinions 289 and 290 mounted in a stationary frame 291, a wheel 292 connected by a chain 293 to another wheel 294, keyed on to a shaft 295, which is supported on one side by the frame 291 and on the opposite side by another stationary frame 296. Upon this shaft are keyed two pinions 297 and 297a, meshing with two other pinions 298 and 298a, which are mounted loose upon a shaft 299, supported by the frame 291 and 296 and an intermediate frame 296a. The pressing rollers 118 and 118a are mounted upon levers 300 and 300a, which can oscillate about the shaft 299, and which are maintained resiliently in their working position by the action of a spring 301. To this end each lever 300 or 300a is connected to an arm 302 or 302a which is normally stationary, by a telescopic link 303 or 303a, which the spring 301 tends to lengthen. These levers 302 and 302a, rendered rigid with one another in rotation by the shaft 299, are immobilized in an adjustable position by a worm 304, supported by the corresponding frame, and capable of being turned by means of a hand wheel 305, the threads of this worm meshing with a toothed sector 306, rigid with the arm 302. In this way the pressure that the rollers 118 and 118a exert upon the bags can be regulated.

The rotation of these rollers is effected continuously by means of chains 307 and 307a connecting wheels 308 and 308a, which are rigid with the pinions 298 and 298a, to wheels 309 and 309a, which are rigid with the rollers 118 and 118a. These latter, like the gumming rollers 110, have a transverse profile which is related to that of the cylinder furnished with posts, so that the oscillations undergone by the arms 300 and 300a when the posts $A_1$ and $A_2$ pass in contact with the rollers 118 and 118a will be of small amplitude.

It is to be observed that the toothed arc of the sector 306 is long enough to enable these rollers to be moved a substantial distance away from the cylinder, for instance when anything has to be done for the upkeep of the mechanisms.

The evacuation device F (Figures 50 and 51) comprises three conveyors composed of endless straps 128, 129, and 130, of which the first and the last pass round pulleys 311 and round a drum 312 respectively, which are superposed and mounted upon shafts 313 and 314 which are supported by stationary frames 315 and 315a, while the straps of the conveyor 129 pass in succession round the drum 312, between the straps 128 and over jockey pulleys 317 and 318, the pivots 319 and 320 of which are supported by two arms 321 articulated about the shaft 314. This conveyor 129 also passes over tensioning pulleys 322, the pivot 323 of which is supported by bent levers 324, fixed upon the shaft 319. The arms 321 are urged by the action of springs 325 in such a way as to press the conveyor 129 against the conveyor 128 or against the bags that are passing between them, and other springs 326 act upon the levers 324 in such a way as to press the rollers 322 against the conveyor 129 so as to ensure the tensioning thereof. The tension of the springs 325 is adjustable by means of hand-wheels 327, which are screwed to a greater or lesser extent along rods 328 connected to the ends of arms 321. The tension of the springs 326 on the other hand is adjustable by screwing the telescopic rods 329 by which they are connected at one end to the levers 324 and at the other end to the ends of the arms 321 by the pivot 320.

The shafts of the pulleys 311 and of the drum 312 are coupled together by toothed wheels 330 and 331, and their rotation is obtained from the pinion 286a mounted upon the frame 7 (Figure 19) through the medium of a pinion 332, a shaft 333, and a pair of pinions 334 and 335 mounted in the stationary frame 315; this last pinion 335 being keyed on to the shaft 313 of the pulleys 311.

Independently of the transmissions effecting the rotation of the various members described above from the main motor M, the machine comprises devices which serve, whenever the length of the bag to be manufactured is to be changed, to modify the distance apart of the members acting upon the ends of these bags. This adjustment is obtained by a displacement of the said members situated on the side of the movable frame 8 or carried by the latter, as has been described more particularly with reference to the posts A2 of the cylinder R, whereas the members situated on the side of the frame 7 remain unmoved. All these displacements are effected simultaneously by the motor M.

As regards the gumming rollers it has been seen that the support 203a of the roller 110a is mounted upon the frame 8 and is displaced with the latter when the nuts 16 and 19 are set in rotation. At the same time the adhesive tank 216 and the rollers 215 and 217 mounted upon this same support are displaced.

On the other hand the pressing roller 118a, with its support 300a and the auxiliary members 297a to 309a, are displaced together as a result of the screwing of the threaded shaft 299 in a wheel 340, which is connected to the hub of this support by a casing 341, in which it can turn under the control of a pinion 342, connected by a shaft 343 and a pinion 344 to the bevel wheel 15a (Figures 19 and 52).

On the side of the introduction of the bags it is convenient, when a change is being made in the length of the latter, to move one or more sets of blades 27 nearer together or further apart, in order that the supporting of the bags upon the tables 30 may be effected throughout their length, without certain blades hampering the passage of the folding members located on the side of the movable frame 8. With this end in view the flexible blades 27 are mounted, freely for the most part, upon horizontal shafts 350a, 350b, 350c, 350d and 350e, supported by the frames (Figures 35 and 36).

The five blades in each vertical row are coupled together by arms 351 and a common connecting rod 352. The first three vertical rows can be raised independently of one another by virtue of one of their arms 351 being keyed on to the corresponding shaft 350a, or 350b or 350c. These key connections are indicated diagrammatically at $x_1$, $x_2$ and $x_3$. It is therefore sufficient to rotate one or more of these shafts, by means of cranks 353a, 353b or 353c, in order to move the corresponding row or rows of blades away from the cylinder. In case of need it is also possible to move the other rows of blades 27 away, thanks to one of their arms 351 being keyed on to one of the shafts 350d or 350e, for instance at $x_4$, $x_5$ and $x_6$.

In order to facilitate the inspection and upkeep, it is also possible to move away from the drum 274 the guiding members 26. The latter are constituted by series of bent arms mounted upon pivots 354, the ends of which are supported by arms 355 and 355a capable of oscillating about the shaft 356 of the upper drum 279.

The present invention is not of course limited to the form of construction illustrated, and the various constructional arrangements described above may be replaced by equivalent or almost equivalent arrangements without thereby affecting the essential features of the invention, which reside primarily in the general arrangement of of the machine.

What I claim is:

1. A machine for the manufacture of paper bags of the "Bates" type from blanks in the form of flattened tubes not closed at their ends, comprising a rotary cylinder turning about a horizontal axis actuated with a continuous rotary movement, a series of flat tables mounted on said cylinder according to the faces of a uniform prism having the same axis as said cylinder, means for bringing the blanks on said tables to a fixed point of their circular course, the opened ends of said blanks being directed towards the opposite sides of the cylinder, gripping and folding devices mounted on said tables and arranged to form closing folds on the ends of the bag blanks during a part of their circular course, a device located at a fixed point outside the rotary cylinder and operative to place a valve comprising a section of flattened paper tube, on an end of each bag blank during its passing said fixed point where the closing of such end is still incomplete, means for gumming the ends of the incompletely closed blank, means to finish the folding of the ends of the blank and to press the parts finally folded against each other, the sleeve thus being fixed in an end of the closed bag in such a position that it makes the inside of said bag connect with the exterior, and means to discharge finished bags outside the tables of the cylinder at a point of their circular course near to the point where the blanks are loaded on said tables, said gumming, pressing and discharging means being located at fixed points outside of the rotary cylinder and being driven in timed relation to the rotation of the cylinder.

2. A machine as in claim 1 wherein the rotary cylinder comprises two spaced drums mounted on a common fixed shaft, means for moving one of these drums away from or nearer to the other as desired, wherein each table comprises cooperating table portions on said two drums, the two table portions of each pair being arranged to support respectively the two ends of the bag blanks and wherein means for controlling the mechanisms for folding, and gripping of the bags mounted on each of the tables, comprises two non-rotary drums housed inside the two rotary drums and a series of cams fixed about said non-rotary drums and adapted to control the working of said mechanisms when the cylinder rotates.

3. A machine as in claim 2 wherein a motor is used to endow the table-bearing cylinder with a continuous rotary motion, and a separate motor is used to control the axial movement of one of the rotary drums of the cylinder and of the corresponding stationary drum by means of a nut rotatively operated by said motor about a threaded part of the fixed shaft carrying the cylinder, said nut being joined to said drums so as to drive them axially while at the same time being free to turn in relation to said drums.

4. A machine as in claim 1 wherein each of said tables comprises marginal members mounted slidingly and adapted to adjust the position of each bag blank delivered on said table, and wherein the gripping and folding devices comprise grippers adapted to press on the table the sides of a bag blank near the end of said blank, a cross-bar directed across the axis of the bag and movable in the longitudinal direction of the bag and also in the perpendicular direction to the plane of the table, for folding back part of the top part of the end of the blank, a movable suction cup placed so as to bear on the top part of the end of the blank and raise this portion against the said cross-bar, fixed suction cups placed so as to retain the bottom of the blank bearing on the table, a pump adapted to produce a vacuum in said suction cups, shaping members adapted to enter into the end of the blank and then move away from each other so as to form slanting folds in the two sides of said end, a bar housed in a groove of the table below the end of the blank and movable outside said groove to raise the end of the bottom part of the blank and straighten out the end of the bottom part of the blank and fold it against an edge of said cross-bar after part of the top part of the end of the blank has been folded back by said cross-bar, said shaping members furthermore being adapted to fold back said raised end of the bottom part of the blank on the end already folded back of the top part, a movable extraction bar placed on the side of the table and adapted to raise said bag above the table, and means to actuate said movable members mounted on each table, such means being controlled by cams fixed about stationary drums.

5. A machine as in claim 1 wherein the means for placing the valves on the bags comprises a spool mounted on an axis fixed outside of the cylinder, means for continually unwinding a band of paper from said spool, means for depositing adhesive gum on the edge of said band, means for folding said band lengthwise in the shape of a continuous flattened tube, and means to cut said tube into sections forming the valves.

6. A machine as in claim 1 wherein each of the tables has marginal members mounted slidingly to adjust the position of each blank brought on the table, and wherein the gripping and folding devices comprise grippers adapted to press the sides of a blank on the table, a cross-bar directed across the axis of the bag and movable in the longitudinal direction of the bag and also in the perpendicular direction to the plane of the table for folding back part of the top part of the end of the blank, fixed suction cups placed so as to retain the bottom of the blank bearing on the table, a movable suction cup adapted to bear on the top of the end of the blank and raise this end against said cross-bar, a pump adapted to produce a vacuum in said suction cups, shaping members adapted to enter into the end of the blank and then move away from each other so as to form slanting folds in the two sides of said end, a bar housed in a groove of the table below the end of the blank and movable outside said groove to raise the end of the bottom of the blank against an edge of said cross-bar after part of the top part of the end of the blank has been folded back by said cross-bar, said shaping members being furthermore adapted to fold back said raised end of the bottom of the blank on the end already folded back of the top of the blank, a movable extraction bar placed below the blank and adapted to raise it above the table and means to actuate said movable members combined with each table, these means comprising springs placed radially about the axis of the cylinder under the tables and adapted to control flexibly said members towards their working position and fixed cams placed inside the cylinder and adapted to bring positively said members towards their inoperative position.

7. A machine as in claim 1 in which each table comprises a pair of spaced table portions and wherein said rotary cylinder comprises a pair of spaced drums mounted on a common axis, the table portions of each table being transversely aligned and removably mounted on the spaced drums, and means for varying the spacing of the drums, whereby bags of different size may be made by changing the spacing of the drums and the size of the table portions.

8. A machine as in claim 1 in which the gumming means comprises rollers having on their periphery projecting parts of flexible material shaped according to the form of the edges to be gummed, swinging supports supporting the axes of these rollers, springs urging these supports to bear the rollers on the bag blanks, means to turn these rollers continually according to the rotation of the cylinder, means for depositing adhesive gum on the projecting parts of the rollers on each turn of the rollers and adjustable abutment tappets adapted to limit the swinging of said supports towards the axis of the cylinder so as to stop the gumming rollers from entering in the spaces of the tables carrying the blanks.

9. A machine as in claim 8 in which a safety device is provided to put the gumming rollers out of action when the feeding of blanks fails, this device comprising means for retaining the rollers in the position to which they are thrust away by the angles of the tables, and an electro-magnetic detecting device to put said retaining means into operation when a table not provided with a bag blank arrives near said gumming rollers, said detecting device comprising a circuit through which a source of current flows, an electromagnet in said circuit adapted to actuate said retaining means through the medium of a time-lag operating device, and contact members between which the blanks pass before being applied on the tables of the rotary cylinder, said members being urged resiliently towards each other and as a result, closing the circuit of said electromagnet when they are not separated from each other by a bag, said time-lag operating device comprising a small cylinder turning at the same speed as the cylinder carrying the tables, pins shiftable longitudinally on said small cylinder, a fixed cam arranged to move said pins successively in one direction, a blade integral with the movable armature of said electromagnet and adapted to move in the opposite direction the pin which passes before it when the electromagnet is excited, a contact-member normally open and adapted to be closed by the pin thus moved when said cylinder has turned a predetermined angle after the electromagnet has been excited, and a second circuit closed by said contact-member and including a second electromagnet connected to actuate said retaining means.

10. A machine as in claim 9 which comprises means for making valves from a continuous band of paper and in which a device is provided to hold up the distribution of a valve each time a table of the cylinder not covered by a valve has passed between the contact members of the electromagnetic detecting device comprising friction rollers adapted to feed the continuous band which manufactures the valves, and mounted declutchably on their driving shafts, their release being controlled by the electromagnetic detecting device means of a second contact-maker normally open and adapted to be closed by said pin at a suitable point of the rotation of the pin-bearing cylinder.

11. A machine as in claim 1 wherein the means for bringing the bag blanks on the tables of the cylinder comprise a belt conveyor passing on pulleys some of which are near the circular course of the tables of the cylinder, said belts being adapted to support bag blanks with their openings directed toward the sides of said belt conveyor, bent guiding members placed against one end of said belt conveyor to direct the blanks towards the tables of the cylinder, several series of flexible blades mounted on respective horizontal shafts placed at different levels, said blades being adapted to press against the tables of the cylinder the blanks coming from the different guiding members, said blades being likewise spaced on their shafts and the blades situated in each of the different vertical planes being coupled together and the different sets of blades thus coupled being also coupled with a desired one of said shafts so that the blades of one of the several sets may be moved away as desired from the course of the tables by a swinging of the respective shafts according to the lengths of the blanks to be fashioned.

GÉRARD BARDET.

REFERENCES CITED

The following references are of record in the file of this patent:

UNITED STATES PATENTS

| Number | Name | Date |
|---|---|---|
| 744,947 | Ward | Nov. 24, 1903 |
| 928,885 | Rogers | July 20, 1909 |
| 1,834,189 | Thiem | Dec. 1, 1931 |
| 1,879,990 | Oles | Sept. 27, 1932 |
| 1,894,726 | Beckman | Jan. 17, 1933 |
| 1,916,293 | Andreas | July 4, 1933 |
| 1,953,432 | Potdevin | Apr. 3, 1934 |
| 2,107,043 | Novick | Feb. 1, 1938 |
| 2,387,274 | Lee | Oct. 23, 1945 |